(12) United States Patent
Ishii et al.

(10) Patent No.: US 12,086,200 B2
(45) Date of Patent: Sep. 10, 2024

(54) ATTRIBUTE-BASED POSITIONING OF BOOKMARKS IN A 3D VIRTUAL SPACE

(71) Applicant: International Business Machines Corporation, Armonk, NY (US)

(72) Inventors: Takehiko Ishii, Yokohama (JP); Tomoka Mochizuki, Tokyo (JP); Takaaki Shiratori, Machida (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

(21) Appl. No.: 17/577,256

(22) Filed: Jan. 17, 2022

(65) Prior Publication Data
US 2023/0229722 A1 Jul. 20, 2023

(51) Int. Cl.
*G06F 16/955* (2019.01)
*G06F 40/20* (2020.01)
*G06F 40/30* (2020.01)
*G06T 15/00* (2011.01)
*G06T 19/20* (2011.01)

(52) U.S. Cl.
CPC .......... *G06F 16/9562* (2019.01); *G06F 40/20* (2020.01); *G06F 40/30* (2020.01); *G06T 15/00* (2013.01); *G06T 19/20* (2013.01); *G06T 2219/2004* (2013.01)

(58) Field of Classification Search
None
See application file for complete search history.

(56) References Cited

U.S. PATENT DOCUMENTS 7,698,170 B1 * 4/2010 Darr .................. G06Q 30/0609
705/26.35
8,266,157 B2 9/2012 Carmel et al.
(Continued)

FOREIGN PATENT DOCUMENTS

| JP | 2000214979 A | 8/2000 |
| JP | 2004139513 A | 5/2004 |
| JP | 2005242964 A | 9/2005 |

OTHER PUBLICATIONS

Kumar et al., Text summarization and visualization using IBM Watson Studio, Jan. 10, 2019.
(Continued)

*Primary Examiner* — Joni Hsu
(74) *Attorney, Agent, or Firm* — Garg Law Firm, PLLC; Rakesh Garg; Kimberly Zillig

(57) ABSTRACT

An embodiment includes determining semantic attributes of a bookmark. The embodiment also includes determining respective attribute values for each of the semantic attributes of the bookmark. The embodiment also includes rendering a three-dimensional (3D) virtual space for display to a user, where the virtual space is defined by three orthogonal axes, each associated with a respective one of the semantic attributes. The embodiment also includes displaying a symbol representative of the bookmark in the virtual space. The symbol is positioned in the virtual space at an intersection of perpendicular projections from locations on the three axes corresponding with respective attribute values of the attributes associated with the respective axes.

16 Claims, 18 Drawing Sheets

(56) References Cited

U.S. PATENT DOCUMENTS

| | | | |
|---|---|---|---|
| 8,705,897 B1 * | 4/2014 | Chao | G06F 7/08 |
| | | | 382/307 |
| 8,914,750 B2 | 12/2014 | Howard et al. | |
| 9,152,704 B2 * | 10/2015 | Oliver | G06F 16/355 |
| 11,609,676 B2 * | 3/2023 | Tran | G06F 3/04815 |
| 2002/0194216 A1 * | 12/2002 | Kanno | G06F 3/0481 |
| | | | 715/277 |
| 2005/0210145 A1 * | 9/2005 | Kim | H04N 21/4788 |
| | | | 709/219 |
| 2006/0259585 A1 * | 11/2006 | Keohane | G06F 16/957 |
| | | | 709/219 |
| 2007/0239734 A1 * | 10/2007 | Arellanes | G06F 16/951 |
| 2008/0243517 A1 * | 10/2008 | Muschett | G10L 15/22 |
| | | | 704/E15.04 |
| 2011/0173145 A1 * | 7/2011 | Wu | G06F 16/353 |
| | | | 706/13 |
| 2012/0215627 A1 * | 8/2012 | Lee | G06Q 30/02 |
| | | | 705/14.45 |
| 2015/0006664 A1 * | 1/2015 | Aramaki | G06F 16/9574 |
| | | | 709/213 |
| 2020/0236441 A1 | 7/2020 | Moon et al. | |

OTHER PUBLICATIONS

IBM Watson Explorer, Supervised Multi-labeling classifier, 2021.
IBM Cloud Docs, Facets, Aug. 12, 2021.
I Magazine, The whole picture of Watson Discovery that draws answers and insights from textual information, 2021.

* cited by examiner

US 12,086,200 B2

ATTRIBUTE-BASED POSITIONING OF BOOKMARKS IN A 3D VIRTUAL SPACE

BACKGROUND

The present invention relates generally to a method, system, and computer program product for data processing. More particularly, the present invention relates to a method, system, and computer program product for attribute-based positioning of bookmarks in a 3D virtual space.

As a user navigates various web pages using a web browser, the user may identify a web page of interest that they would like to frequent in the future. To facilitate such future visits, a user may create a bookmark as a reference to the web page. For example, where a web page is identified by a Uniform Resource Locator (URL), the web browser locally saves a bookmark to the web page by maintaining the URL of the web page and a label to identify the web page on a computer readable storage medium. When the user wishes to subsequently visit the web page, the user may select the locally saved bookmark from among a list of other locally saved bookmarks, causing the web browser to navigate to the URL associated with the bookmark to access the web page.

SUMMARY

The illustrative embodiments provide for attribute-based positioning of bookmarks in a 3D virtual space. An embodiment includes determining semantic attributes of a bookmark. The embodiment also includes determining respective attribute values for each of the semantic attributes of the bookmark. The embodiment also includes rendering a three-dimensional (3D) virtual space for display to a user, where the virtual space is defined by three orthogonal axes, where each of the orthogonal axes is associated with a respective one of the semantic attributes. The embodiment also includes displaying a symbol representative of the bookmark in the virtual space, where the displaying includes positioning the symbol in the virtual space at an intersection of perpendicular projections from locations on the three axes corresponding with respective attribute values of the attributes associated with the respective axes. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
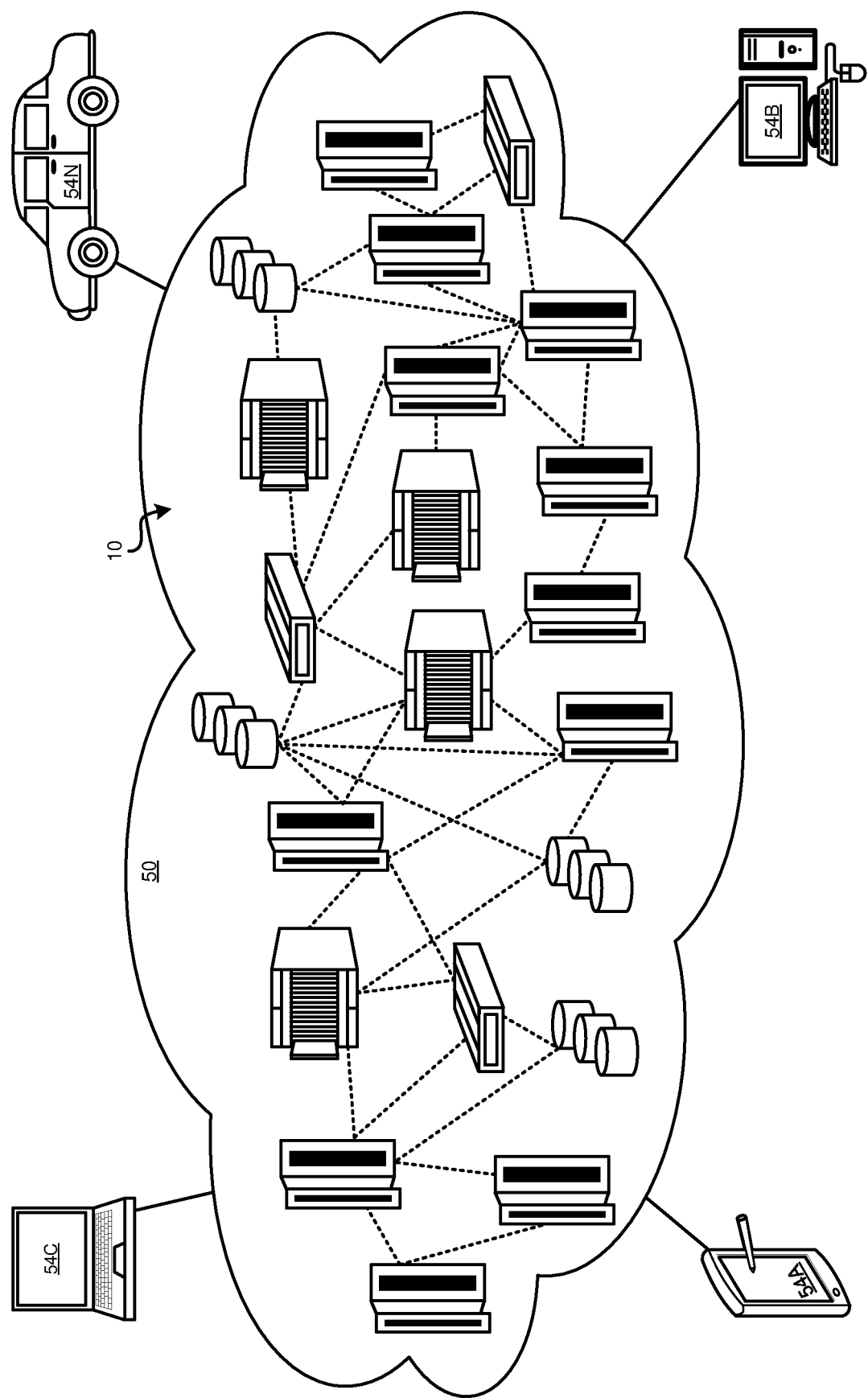
FIG. 1 depicts a cloud computing environment according to an embodiment of the present invention.

Over time, it is common for a user to accumulate an extensive list of web pages of interest. The typical user will utilize web browser functionality that allows for the creation of bookmarks that can be used to revisit web pages. Most web browsers include a graphic user interface (GUI) that displays the user's bookmarks as hyperlinks that a user can select to revisit the bookmarked web page. A bookmark, as displayed, normally includes a title or name for the bookmark and the URL of the web page. The bookmark name or title is usually used to display the bookmark in a list format with the user's other bookmarks. Absent intervention by the user, most web browsers will continue to add new bookmarks to a single growing list. Bookmarks in this list may appear in alphabetic order by name of the bookmark, or in the order in which the bookmarks were created, or in some other order.

As a result, unless the user takes the time to try to manually introduce some structure to the bookmark collection, the bookmarks will be presented to the user by the browser as a list with no particular ordering, thus resulting in unwieldy access to desired bookmarks. As more bookmarks are added, this situation may be compounded and become more frustrating for the user. Consequently, displaying a simple list of bookmarks in the browser interface may become difficult in usability terms, especially for users who do not have full interactive capabilities. Accordingly, the effort spent in locating the desired bookmark may generally become unacceptably long.

Although most browsers typically provide for the classification of each bookmark in terms of user-generated hierarchical folders, many users simply add the bookmark into the default location rather than taking the time to categorize it and select a certain ideal location for it. Some users may attempt to introduce order after there is already an extensive list of bookmarks. However, this can be a time-consuming task for a collection of bookmarks that has already grown to dozens or hundreds of bookmarks. Also, over time, users may not remember exactly how some bookmarks were categorized in their folder system and, as a result, bookmarks may continue to be difficult to find despite their attempt to introduce some organization.

This problem is compounded in social bookmarking environments where bookmarks are shared among multiple users. An organizational structure created by one user may not be as intuitive for other users. The convenience of sharing bookmarks is therefore often detracted by the difficulty in trying to navigate unfamiliar organizational structures created by other users.

Some systems that allow bookmarks to be shared reside on a network, such as an intranet, where users also share files. The bookmarks in some such systems now include bookmarks to computer files stored on the network. This adds a level of convenience in that bookmarks to computer files may be shared to allow for users to quickly access the bookmarked computer file instead of manually navigating the network to get to the resource. However, adding this new category of bookmarks may also result in an increase in the rate at which bookmarks are added to a social bookmark repository. As the number of bookmarks increases, the effort required to locate certain bookmarks among the collection increases as well.

Aspects of the present disclosure address the deficiencies described above by providing mechanisms (e.g., systems, methods, machine-readable media, etc.) that detect and store attribute information for bookmarks and uses the attributes as display parameters for selecting bookmarks to present in a three-dimensional virtual space. In some embodiments, the attributes may be determined automatically without the need for human intervention. In some embodiments, the attributes are automatically determined using artificial intelligence techniques to provide for efficient and consistent organization of the bookmarks. In some embodiments, the attributes may be determined semi-automatically by including user-provided attributes and presenting suggested attributes to users for consideration and approval before adding the attributes to the bookmark management system.

Disclosed embodiments provide a view of bookmarks arranged in a three-dimensional (3D) virtual space. In illustrative embodiments, the 3D virtual space is representative of a sematic space that serves as an organizational construct for the bookmarks. The 3D virtual space is defined by three orthogonal axes that establish a coordinate system for a grid that is used to select and position the bookmarks for display. In some embodiments, the coordinate system is a Cartesian system in 3D space, but in other embodiments, the coordinate system may be any other type of coordinate system, such as an oblate spheroid, cylindrical or spherical coordinate system, polar coordinates system, or other coordinate system designed for one of various manifolds and vector spaces, among others. In illustrative embodiments, the 3D virtual space is rendered on a two-dimensional screen so as to have the appearance of a cube or rectangular prism that is defined by three orthogonal axes (X, Y, Z).

In illustrative embodiments, each axis represents an attribute of a bookmark or bookmarked content, where bookmarked content refers to the content of the bookmarked web page or computer file. Non-limiting examples of attributes may include attributes that are based on semantic categories of topics (e.g., travel, weather, information technology, healthcare), locations (e.g., domain, city, country, region), and/or properties of the bookmark or bookmarked content (e.g., access frequency, date/time of creating the bookmark, date/time the content was created, name of the author(s) of the content, date/time of last update of the content). Other examples of attributes may include characteristics related to visual information, audio information, and text information in the content. The attributes may include information that is contained by, or communicated by, various features, such as a certain texture, shape, appearance, sound, duration, arrangement, inter-relationship (such as between objects in a visual format) and order (such as of letters in text). In this regard, it may be considered that the attributes may exhibit various forms to provide a variety of ways to index or reference the content of the bookmarked web page or computer file.

In an illustrative embodiment, each bookmark is stored in memory with a plurality of attributes and respective attribute values. For example, a bookmark to the website for the Grand Canyon may be stored with the attribute "STATE" having an attribute value of "ARIZONA," and with the attribute "TRAVEL" having an attribute value of "NATIONAL PARK," along with other attributes such as "ACCESS FREQUENCY" and "BOOKMARK CREATION DATE" and their respective attribute values. A user searching for travel-related bookmarks may select the attributes "TRAVEL," "STATE," and "ACCESS FREQUENCY" to see bookmarks related to travel to particular states and get a sense of which bookmarked contents are most frequently accessed. In this example, the bookmark for the Grand Canyon will be among those displayed in the resulting 3D virtual space since it is stored with the three selected attributes. Also, each axis represents a range of values for its assigned attribute, and the bookmark will be positioned in the 3D space based on where its attribute values align with the same values along the axes.

In illustrative embodiments, the bookmarks are displayed using icons or other symbolic representations. In some embodiments, clusters of bookmarks are consolidated and displayed as a bookmark cluster or group to avoid an overly-populated display that may become difficult to comprehend. In such embodiments, a user may select a bookmark group to cause the display of a 3D subspace showing the grouped bookmarks. Also, in some embodiments, the user interface allows the user to control the orientation and position of the 3D virtual space by manipulating the virtual space in six degrees of freedom (DOFs)—three for translation (i.e., both directions parallel to each of the X, Y, and Z axes), and three for rotation (i.e., both directions about each of the X, Y, and Z axes)—as well as zooming in and out to enlarge or reduce the size of the displayed virtual space.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
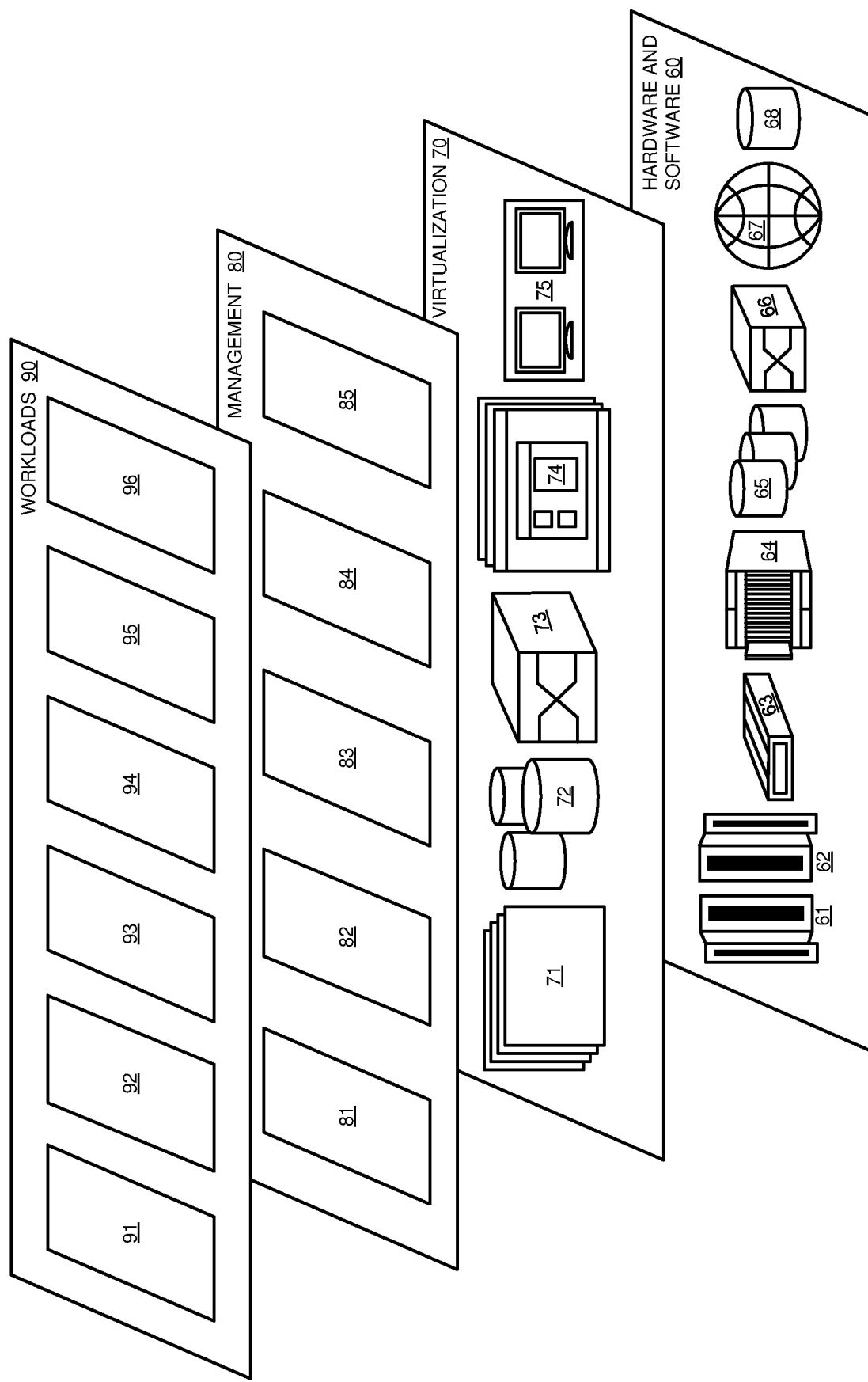
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for attribute-based positioning of bookmarks in a 3D virtual space. In addition, workloads and functions 96 for attribute-based positioning of bookmarks in a 3D virtual space may include such operations as data analysis and machine learning (e.g., artificial intelligence, natural language processing, etc.), as described herein. In some embodiments, the workloads and functions 96 for attribute-based positioning of bookmarks in a 3D virtual space also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
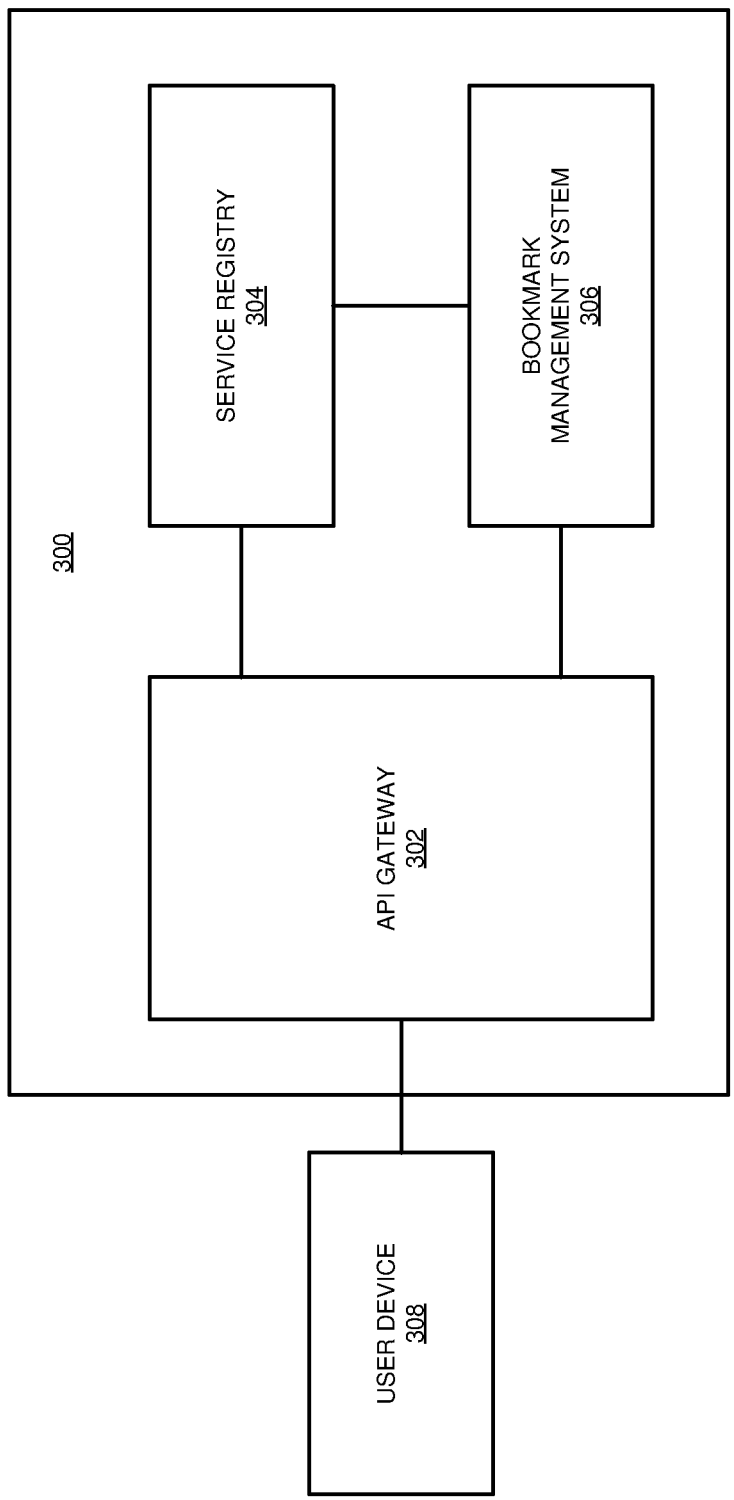
FIG. 3 depicts a block diagram of an example service infrastructure that includes a bookmark management system in accordance with an illustrative embodiment.

With reference to FIG. 3, this figure depicts a block diagram of an example service infrastructure 300 that includes a bookmark management system 306 in accordance with an illustrative embodiment. In some embodiments, the bookmark management system 306 is deployed in workloads layer 90 of FIG. 2. By way of example, in some embodiments, bookmark management system 306 is implemented as a cloud-based system for hosting and organizing bookmarks that may be shared by multiple users, for example across a department, organization, or enterprise.

In the illustrated embodiment, the service infrastructure 300 provides services and service instances to a user device 308. User device 308 communicates with service infrastructure 300 via an API gateway 302. In various embodiments, service infrastructure 300 and its associated bookmark management system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like bookmark management system 306. API gateway 302 receives service requests issued by client applications, and creates service lookup requests based on service requests. As a non-limiting example, in an embodiment, the user device 308 includes software, such as a web browser or file viewer, that includes a graphical user interface that depicts at least a portion of a web page or computer file and allows a user to create a bookmark as a reference to the web page or computer file.

In the illustrated embodiment, service infrastructure 300 includes a service registry 304. In some embodiments, service registry 304 looks up service instances of bookmark management system 306 in response to a service lookup request such as one from API gateway 302 in response to a service request from user device 308. For example, in some embodiments, the service registry 304 looks up service instances of bookmark management system 306 in response to requests from the user device 308 related to bookmark management.

In some embodiments, the service infrastructure 300 includes one or more instances of the bookmark management system 306. In some such embodiments, each of the multiple instances of the bookmark management system 306 run independently on multiple computing systems. In some such embodiments, bookmark management system 306, as well as other service instances of bookmark management system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
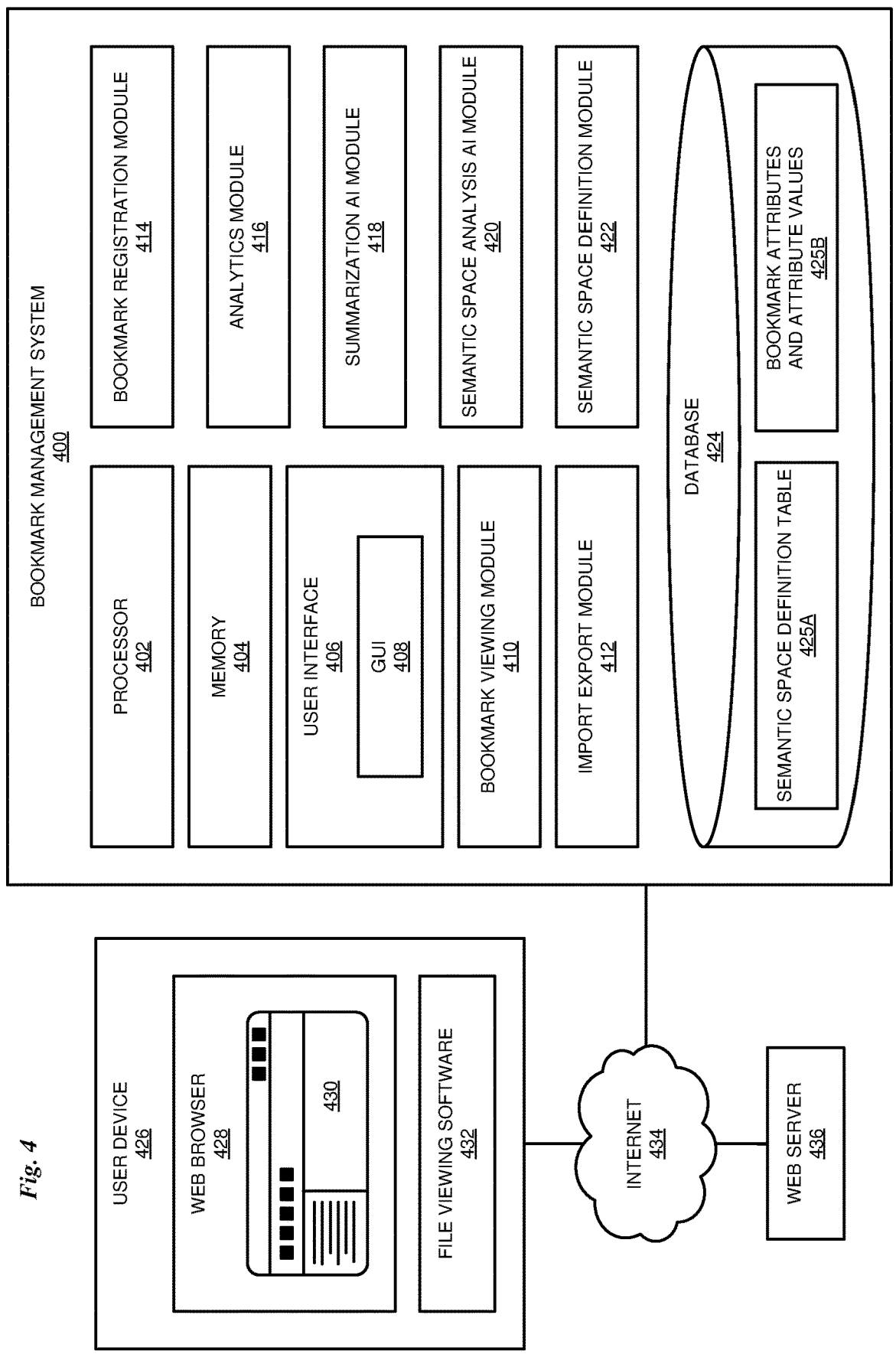
FIG. 4 depicts a block diagram of an example bookmark management system in accordance with an illustrative embodiment.

With reference to FIG. 4, this figure depicts a block diagram of an example bookmark management system 400 in accordance with an illustrative embodiment. In a particular embodiment, the bookmark management system 400 is an example of the workloads and functions 96 for classifier processing of FIG. 1.

In some embodiments, the bookmark management system 400 includes a processor 402, memory 404, a user interface 406 that includes a GUI 408, a bookmark viewing module 410, an import export module 412, a bookmark registration module 414, an analytics module 416, a summarization AI module 418, a semantic space analysis AI module 420, a semantic space definition module 422 and a database 424. In some embodiments, the database 424 includes a semantic space definition table 425A and bookmark attributes and attribute values data 425B. In alternative embodiments, the bookmark management system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the processing unit ("processor") 402 to perform various computational and data processing tasks, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

In the illustrated embodiment, the user interface 406 provides a point of human interaction with the bookmark management system 400. For example, in the illustrated embodiment, the user interface 406 communicates with a user device 426 via a network, such as the Internet 434. The user device 426 may be any type of user computing device, for example the personal digital assistant (PDA) or cellular telephone 54A, desktop computer 54B, laptop computer 54C, and/or automobile computer system 54N shown in FIG. 1, and may include such things as a display, touch screen, keyboard, processor, memory, network interface, and other known components of such computing devices. In the illustrated embodiment, the user device 426 includes a web browser 428 that allows a user to navigate various web pages, including web page 430, which the user may identify as a web page of interest that they would like to frequent in the future. To facilitate such future visits, the user may create a bookmark using the bookmark management system 400 as a reference to the web page 430. The user device 426 includes file viewing software 432 that allows a user to view associated files that they would like to access in the future. To facilitate such future access, the user may create a bookmark using the bookmark management system 400 as a reference to the location of the file. The file viewing software 432 may be any type of software that allows a user to view one or more types of files (e.g., having one or more different file extensions), such as text files, log files, source code files, documents, images, or other types of files. In some embodiments, the web browser 428 may also be used to display text and images rendered by the user interface 406 and/or bookmark viewing module 410.

In the illustrated embodiment, the bookmark viewing module 410 renders a view of one or more bookmarks in a three-dimensional (3D) virtual space. Examples of such views are shown in FIGS. 5-8 and described below. In some embodiments, the bookmark viewing module 410 also renders a view of a user interface that includes one or more user controls associated with the bookmark display, for example as shown in FIG. 9 and described below.

In some embodiments, the bookmark viewing module 410 receives a notification when a user inputs a command to the bookmark management system 400 to invoke a 3D bookmark browser. Note that a "command" as used herein includes textual command-line commands, as well as commands initiated by the user in other ways, such as voice commands, commands that are generated when the user activates a user interface (UI) element, and commands that are generated when the user or performs a touch screen gesture. Responsive to the command to invoke the 3D bookmark browser, the bookmark viewing module 410 checks the user profile to determine if the user has established preferences for default semantic attributes for the three axes of the 3D virtual space. Alternatively, or if no preferences are set, the bookmark viewing module 410 prompts the user to select from a list of attribute values for each of the axes.

Once the 410 has determined which three attributes should be used for the axes, the bookmark viewing module 410 renders the 3D virtual space, which is a graphical representation of the semantic space defined by the three selected attributes. The bookmark viewing module 410 will then display symbols for each of the bookmarks that belong in the selected semantic space. The symbols may be any type of indicia that may be displayed as representative of a bookmark, for example, an icon or text box. A user may then look around the 3D space and finds a bookmark/file which is suitable for user's purpose. To make it easy to search bookmark/file, a user can change a dimension from 3D to 2D or 1D by fixing value(s) of selected axis/axes. The user may open a web page or file associated with a bookmark found in the 3D bookmark browser using an external program for viewing the content.

In some embodiments, the user may also change the attributes associated with one or more of the axes to change the set of bookmarks that are displayed. In some embodiments, the user may save a set of selected attributes for the axes as a default set in the user profile.

In the illustrated embodiment, the bookmark management system 400 provides various ways for a user to add, copy, or remove bookmarks. For example, the import export module 412 provides functionality to allow users to select one or more bookmarks to import into the bookmark management system 400 and/or export from the bookmark management system 400 to the user's local web browser 428 or to another software application. In some embodiments, the export process may involve copying bookmarks from the bookmark management system 400 or removing bookmarks from the bookmark management system 400. In the illustrated embodiment, the bookmark registration module 414 also provides functionality to allow users to add a bookmark to the bookmark management system 400. The bookmark registration module 414 would generally involve adding a new bookmark, whereas the import function of the import export module 412 would generally involve adding existing bookmarks from another system. In some embodiments, the import export module 412 is configured to import bookmarks from, and/or export bookmarks to, one or more different file types, such as HTML, CSV, XML, and/or JSON files.

In some embodiments, when a user initiates a process to add one or more bookmarks, the bookmark management system 400 signals the analytics module 416 about the new bookmark(s). The analytics module 416 manages two AI modules—the summarization AI module 418 and the semantic space analysis AI module 420—that use machine-learning techniques to automatically determine information about the bookmarked item(s), including attributes that are relevant to the bookmarked content.

In some embodiments, the analytics module 416 receives location information with the new bookmark that indicates where the web page or document is located, such as a URL or network path. For example, in the case of the web page 430, the new bookmark may include a URL associated with an IP address of web server 436 that is generating the web page being bookmarked. In some embodiments, the analytics module 416 retrieves content of the web page or document that is being bookmarked and provides this content to the summarization AI module 418 and the semantic space analysis AI module 420.

Figure 10:
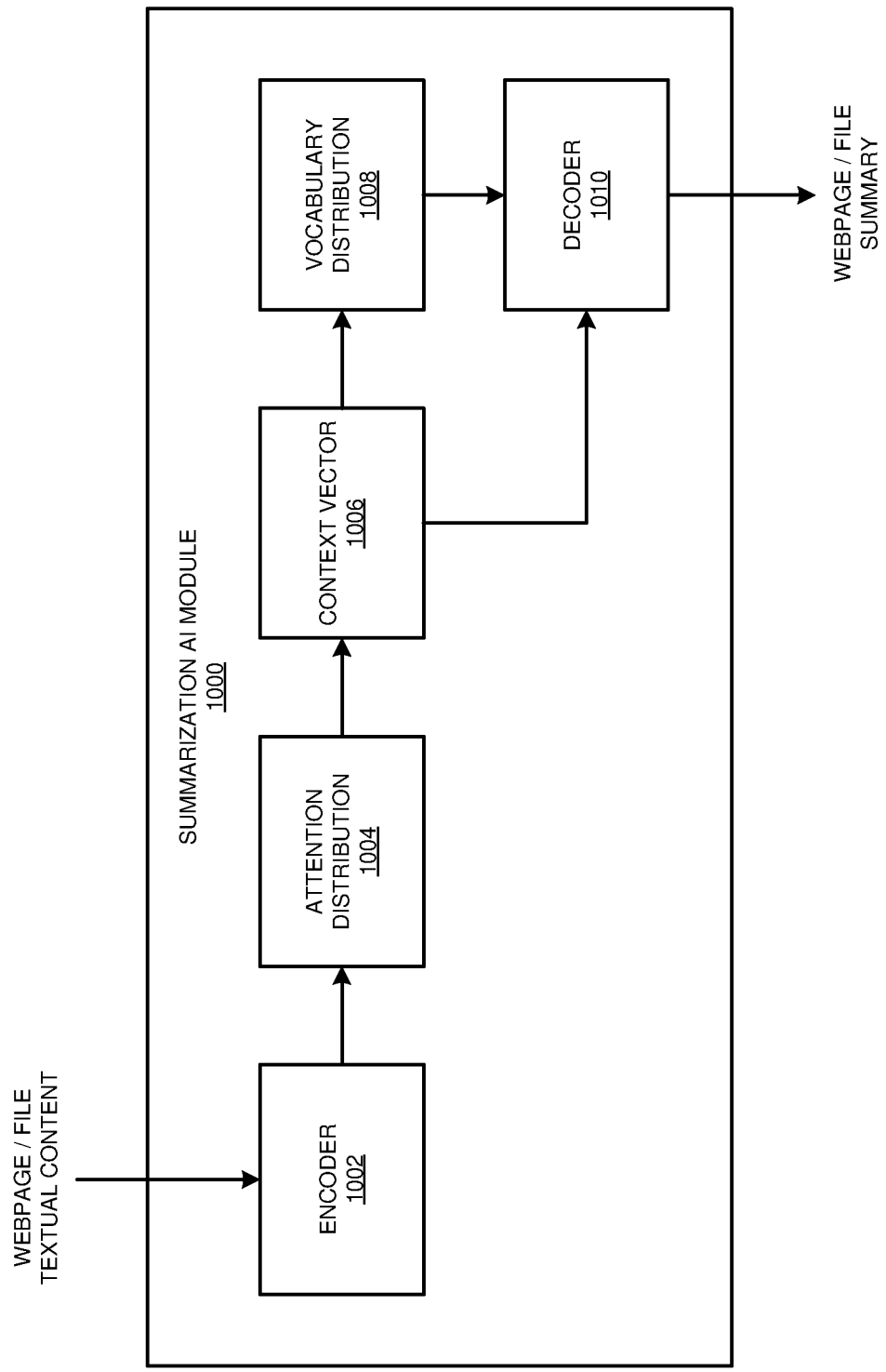
FIG. 10 depicts a block diagram of a summarization AI module in accordance with an illustrative embodiment.

In the illustrated embodiment, the summarization AI module 418 automatically generates a summary of the bookmarked content. An example of a summarization AI module 418 is shown in FIG. 10 and described below. However, there are numerous alternative summarization techniques that may be used in an implementation of the summarization AI module 418. In some embodiments, the analytics module 416 invokes the summarization AI module 418 only when the amount of text in the bookmarked content exceeds some threshold amount in order to improve the accuracy of the semantic space analysis AI module 420 and the determined attributes. In some embodiments, this threshold amount is adjustable by the user. In some such embodiments, the use of the summarization AI module 418 increases processing time, but also increases accuracy, so the user may set the threshold amount based on the user's prefer trade-off level between speed and accuracy of the bookmark management system 400.

Figure 11:
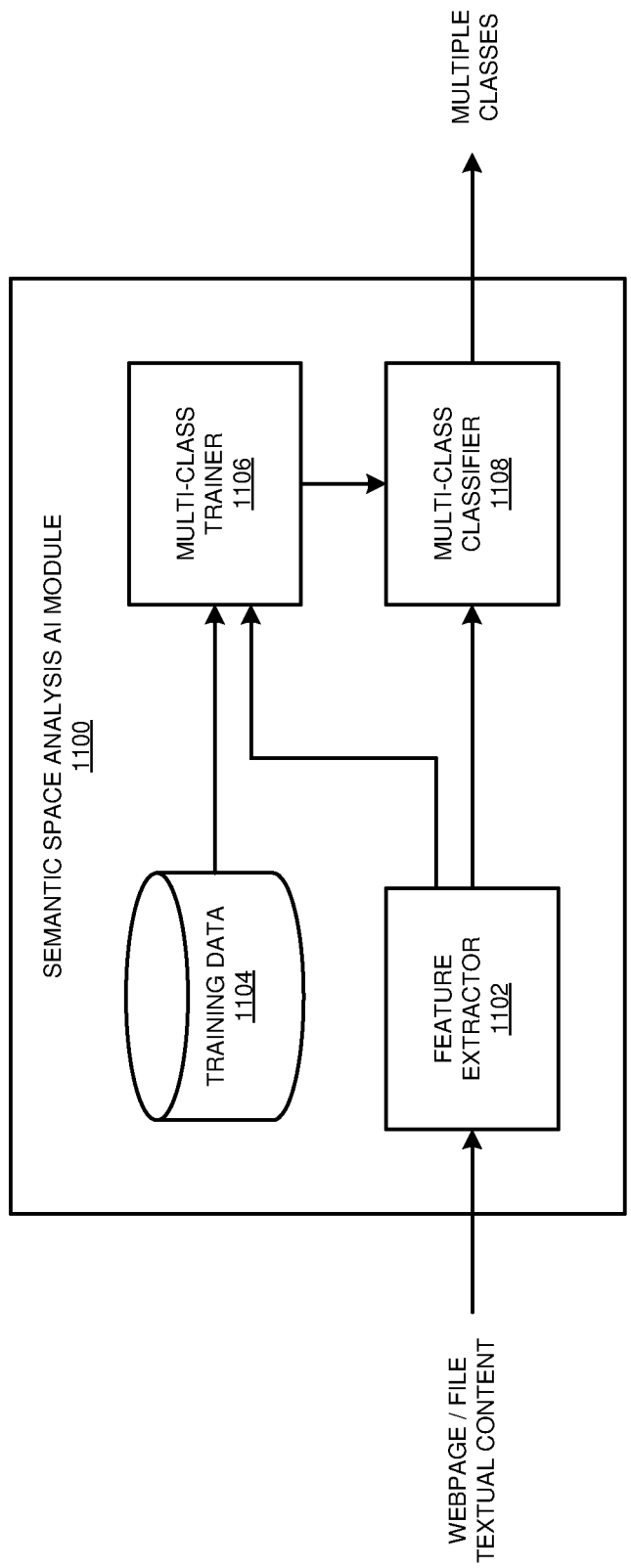
FIG. 11 depicts a block diagram of an example semantic space analysis AI module in accordance with an illustrative embodiment.

In the illustrated embodiment, the semantic space analysis AI module 420 automatically classifies the content of the bookmarked content into a plurality of classes. An example of a semantic space analysis AI module 420 is shown in FIG. 11 and described below. However, there are numerous alternative classification techniques that may be used in an implementation of the semantic space analysis AI module 420. In some embodiments, the classes correspond with attributes that may be assigned to the axes of the 3D virtual space. In some embodiments, the semantic space analysis AI module 420 is a multi-class classifier that inputs the bookmarked content or the summarized bookmarked content and outputs one or more predicted classes.

In some embodiments, the semantic space analysis AI module 420 also predicts a degree of relevance of each of the predicted classes to the attribute and assigned axis. In some embodiments, the relevance is quantified or mapped to an appropriate value in the fixed value list, and the results (vector values) are saved in the database 424 or the like. In the illustrated embodiment, the type of the value of an axis candidate is a degree of relevance or is a value from a fixed value list. An example of a fixed value list may include attributes that are only either True or False, indicating whether the attribute is applicable to the bookmarked content. An example of a degree of relevance may include attributes for which a continuous or stepped range of values are applicable, such as number of visits, percentage of positive feedback, or size of the content. In some embodiments, if the type of the value of an axis candidate is a fixed value list, pattern matching, for example, is used to record true or false indicating whether it applies to each fixed value.

An example includes where the axis attributer is a "place name" and a list of locations, such as cities, countries, or continents, are in the list.

In some embodiments, if the semantic space analysis AI module 420 extracts values that can be axis candidates or value types different from predefined axis candidates or value types, or mapping to an appropriate value in a fixed value list is impossible, the bookmark management system 400 may suggest the new values be added. At this time, the user can modify the axis candidates and value types, or add new ones.

In the illustrated embodiment, the semantic space definition module 422 receives the results from the summarization AI module 418 and the semantic space analysis AI module 420. the semantic space definition module 422 uses this information to define semantic space(s) that are applicable to an imported bookmark. Alternatively, the semantic space definition module 422 receives attributes selected for display and determines which bookmarks should appear in the selected space.

In the illustrated embodiment, the database 424 is stored on a computer readable storage medium and is used to store persistent data for the bookmark management system 400. For example, the database 424 includes a semantic space definition table 425A and a bookmark attributes and attribute values data 425B. In the illustrated embodiment, the semantic space definition table 425A includes data generated by the semantic space definition module 422 and the 425B includes data generated by the summarization AI module 418 and the semantic space analysis AI module 420.

Figure 5:
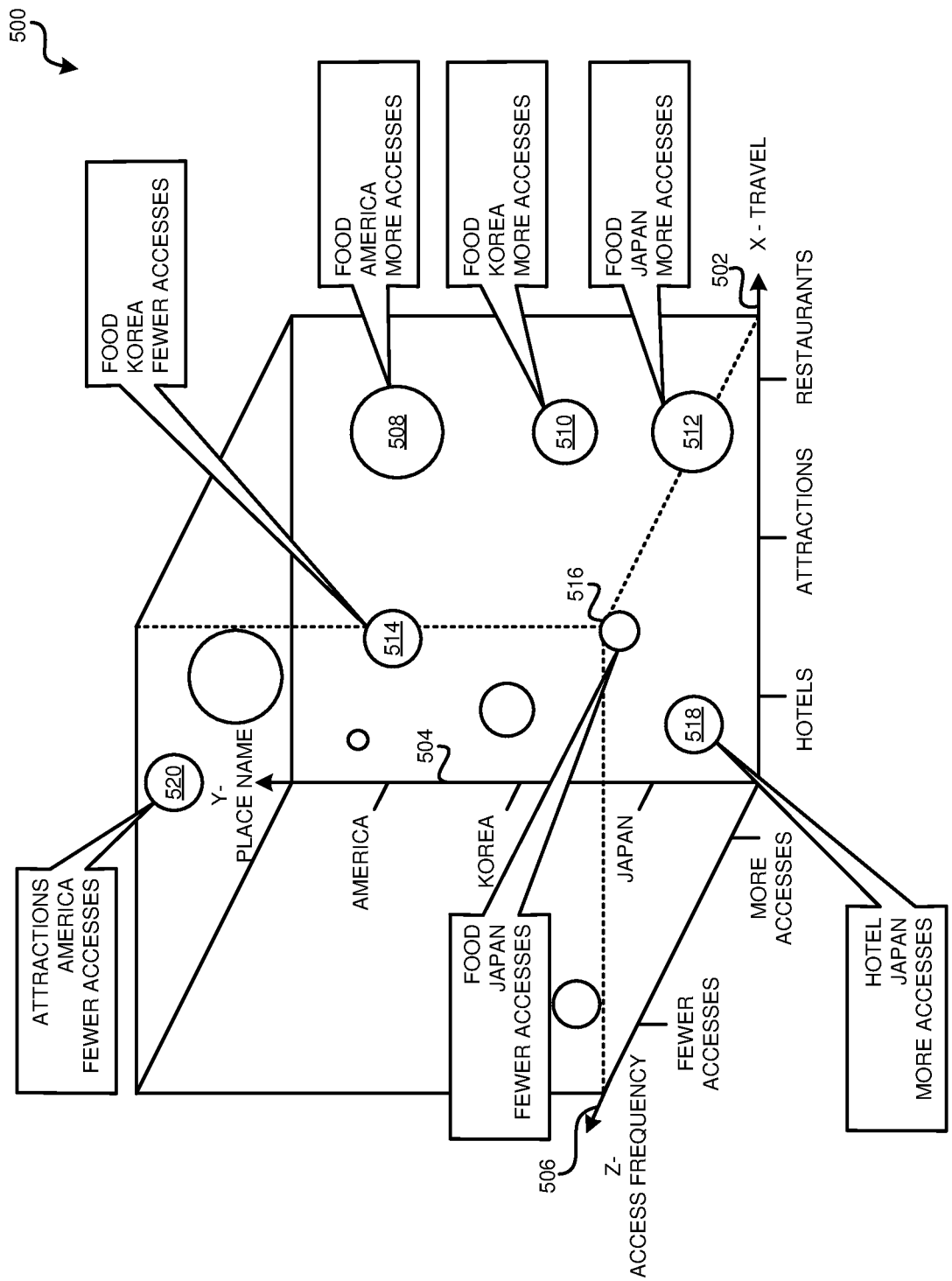
FIG. 5 depicts a schematic diagram of a 3D virtual space representative of a sematic space that serves as an organizational construct for bookmarks in accordance with an illustrative embodiment.

With reference to FIG. 5, this figure depicts a schematic diagram of a 3D virtual space 500 representative of a sematic space that serves as an organizational construct for bookmarks in accordance with an illustrative embodiment. In a particular embodiment, the virtual space 500 is an example of a 3D virtual space rendered by the user interface 406 or bookmark viewing module 410 of FIG. 4. In some embodiments, the rendering of the virtual space 500 is interactive such that it allows the user to control the display by manipulating the virtual space 500 in six degrees of freedom (DOFs)—three for translation (i.e., both directions parallel to each of the X, Y, and Z axes), and three for rotation (i.e., both directions about each of the X, Y, and Z axes)—as well as zooming in and out to get a clear view from any angle of the bookmark symbols being shown.

In the illustrated embodiment, a plurality of bookmarks 508, 510, 512, 514, 516, 518, and 520 associated with respective attribute datasets are symbolically represented in the virtual space 500. The attribute datasets enable the expression of various semantic relationships and distinctions among the bookmarks 508-520 that provide a basis for an intuitive organization and visual display of the bookmarks. The virtual space 500 is a geometric representation of the semantic relationships and distinctions. The geometric representation may be implemented in a variety of ways and topographies, according to various embodiments. For example, in some embodiments, geometries may be represented using various topographies, such as 2D, 3D Cartesian/Euclidean space, 3D non-Euclidean space, manifolds, etc.

For example, FIG. 5 illustrates an embodiment of a virtual space 500 arranged as a three-dimensional virtual space defined by three orthogonal axes 502, 504, and 506. A coordinate system defines a grid for locating objects in the virtual space 500, such that symbolic representations of bookmarks 508-520 may be located within the virtual space 500 using the coordinate system. In some embodiments, the coordinate system is a Cartesian system in 3D space, but in other embodiments, the coordinate system may be any other type of coordinate system, such as an oblate spheroid, cylindrical or spherical coordinate systems, polar coordinates systems, or other coordinate system designed for various manifolds or vector spaces, among others. In the illustrated embodiment, the virtual space 500 is rendered on a two-dimensional screen so as to have the appearance of a cube or rectangular prism that is defined by three orthogonal axes (X, Y, Z).

Figure 6:
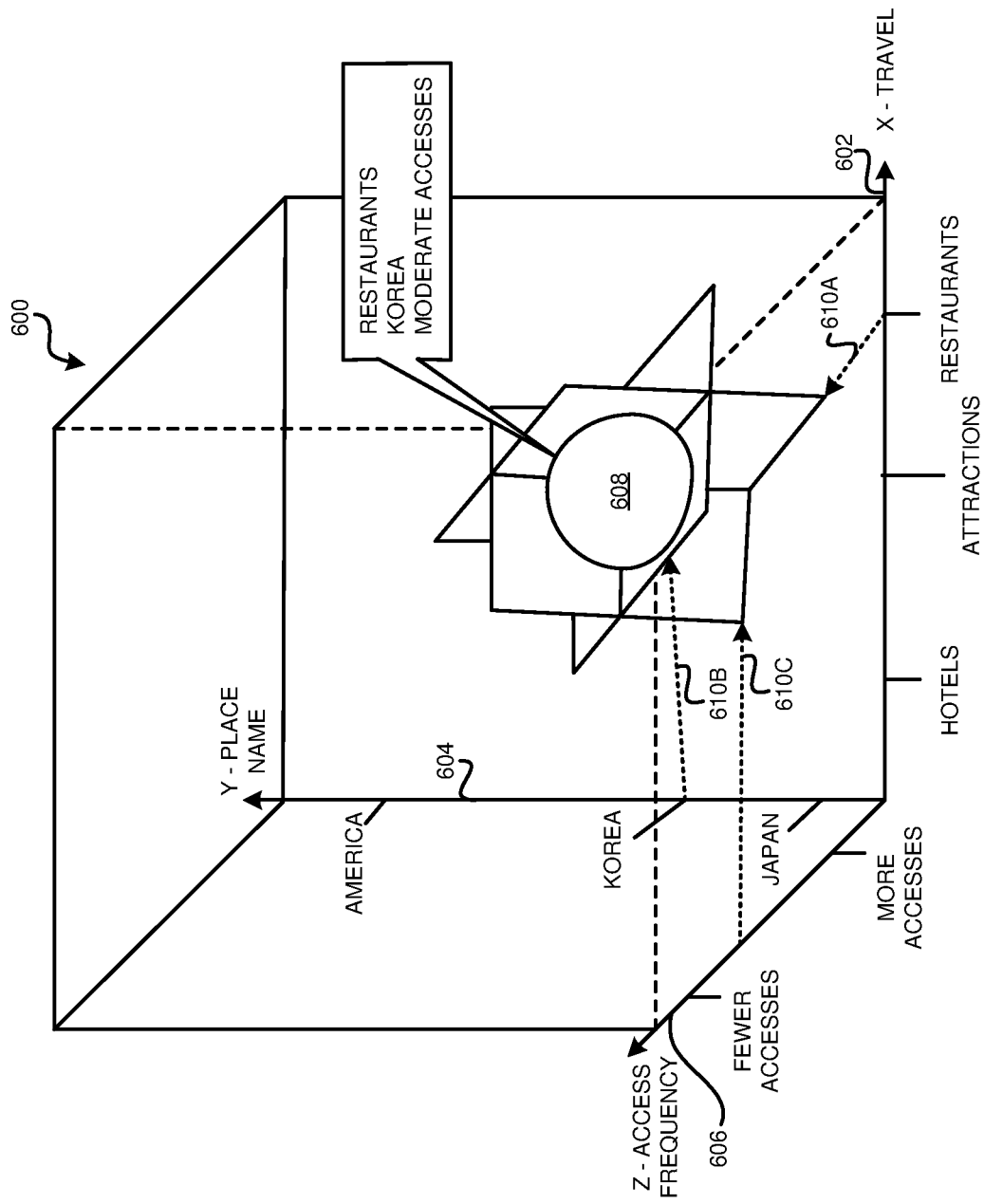
FIG. 6 depicts a schematic diagram of a 3D virtual space representative of a sematic space that serves as an organizational construct for bookmarks in accordance with an illustrative embodiment.

With reference to FIG. 6, this figure depicts a schematic diagram of a 3D virtual space 600 representative of a sematic space that serves as an organizational construct for bookmarks in accordance with an illustrative embodiment. In a particular embodiment, the virtual space 600 is an example of a 3D virtual space rendered by the bookmark management system 400 of FIG. 4.

Virtual space 600 is defined by axes 602, 604, and 606, which correspond to axes 502, 504, and 506, respectively, of FIG. 5, such that the descriptions of axes 502, 504, and 506 applies equally to axes 602, 604, and 606. Thus, axes 602, 604, and 606 are associated with particular respective attributes, and coordinates along each axis are associated with respective attribute values. As a non-limiting example, axis 602 is the X axis and is associated with "TRAVEL," axis 604 is the Y axis and is associated with "PLACE NAMES," and axis 606 is the Z axis and is associated with "ACCESS FREQUENCY."

In the illustrated embodiment, virtual space 600 includes bookmark 608 represented by a spherical symbol. The bookmarks 608 is associated with attributes that allow it to be positioned in the semantic space represented by the virtual space 600. For example, bookmark 608 is associated with the "TRAVEL" attribute, and has a "TRAVEL" attribute value of "RESTAURANTS," is associated with the "PLACE NAMES" attribute, and has a "PLACE NAMES" attribute value of "KOREA," and is associated with the "ACCESS FREQUENCY" attribute, and has an "ACCESS FREQUENCY" attribute value of that is somewhat near the middle of the range of Z coordinates with "MODERATE FREQUENCY.

Thus, the bookmark 608 is represented by a sphere in the virtual space 600 positioned at the intersection of perpendicular projection 610A from "RESTAURANTS" on the X axis, perpendicular projection 610B from "KOREA" on the Y axis, and perpendicular projection 610C from about halfway between "MORE ACCESSES" and "FEWER ACCESSES" on the Z axis. The perpendicular projections 610A-610C are planes that extend perpendicular from an attribute axis in one direction and extend along the attribute value of the bookmark in another direction. The perpendicular projections 610A-610C are partially shown as broken arrows for the sake of clarity. The perpendicular projection 610A is a Y-Z plane with the X coordinate fixed at "RESTAURANTS." The perpendicular projection 610B is an X-Z plane with the Y coordinate fixed at "KOREA." The perpendicular projection 610C is an X-Y plane with the Z coordinate fixed at about the halfway point between "MORE ACCESSES" and "FEWER ACCESSES."

Figure 7:
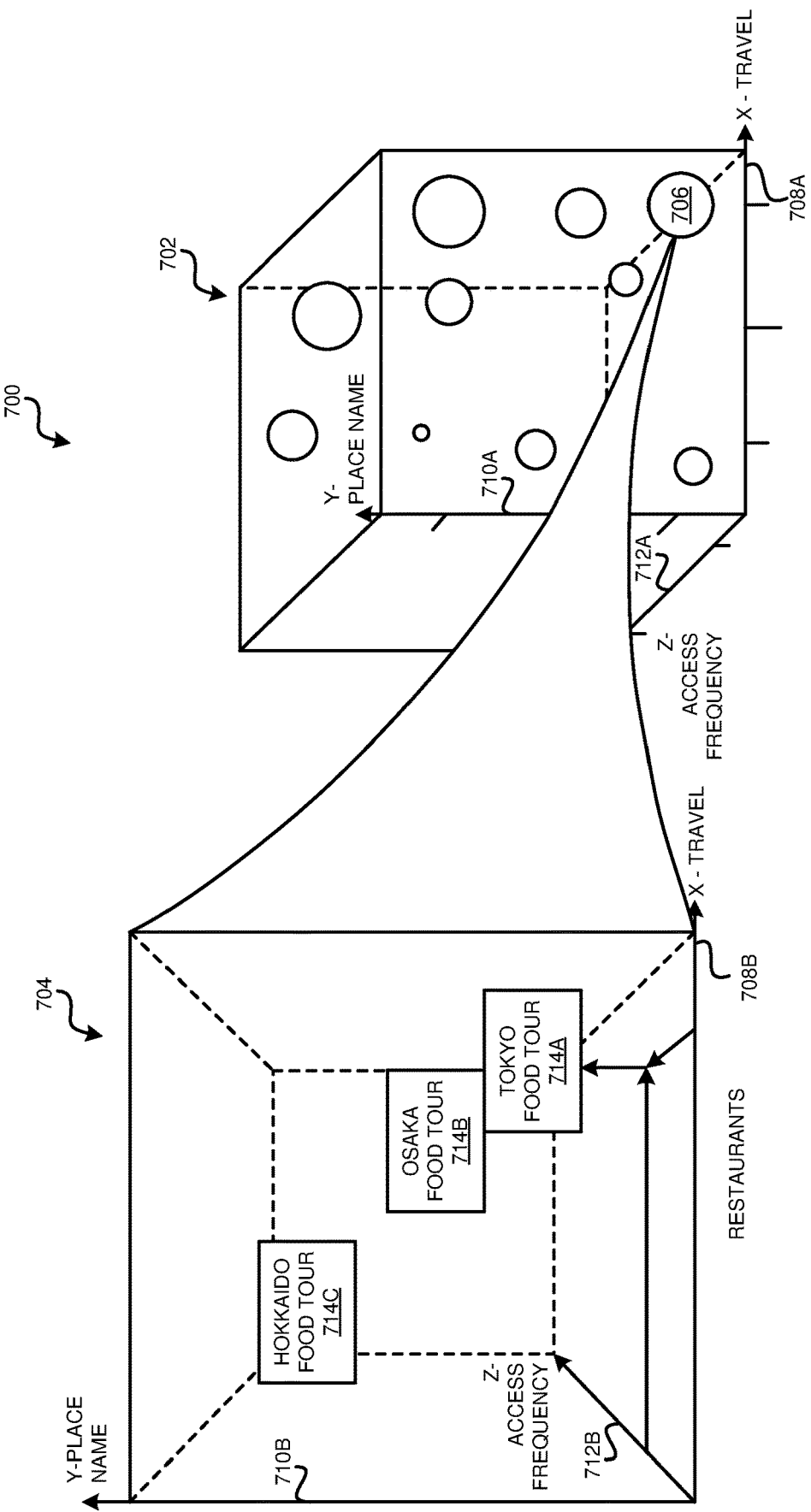
FIG. 7 depicts a schematic block diagram of a bookmark expanding operation from a 3D virtual space to a 3D virtual subspace in accordance with an illustrative embodiment.

With reference to FIG. 7, this figure depicts a schematic block diagram of a bookmark expanding operation 700 from a 3D virtual space 702 to a 3D virtual subspace 704 in accordance with an illustrative embodiment. In a particular embodiment, the virtual space 702 and virtual subspace 704 are examples of 3D virtual spaces rendered by the bookmark management system 400 of FIG. 4.

Virtual space 702 is defined by axes 708A, 710A, and 712A, which correspond to axes 502, 504, and 506, respectively, of FIG. 5, such that the descriptions of axes 502, 504, and 506 applies equally to axes 708A, 710A, and 712A. Thus, axes 708A, 710A, and 712A are associated with particular respective attributes, and coordinates along each axis are associated with respective attribute values. As a non-limiting example, axis 708A is the X axis and is associated with "TRAVEL," axis 710A is the Y axis and is associated with "PLACE NAMES," and axis 712A is the Z axis and is associated with "ACCESS FREQUENCY."

In the illustrated embodiment, two or more bookmarks may be grouped together and represented by a single symbol to avoid a display that is overly cluttered and difficult to comprehend. The virtual space 702 shows an example of grouped bookmarks in symbol 706. In some embodiments, the symbol 706 may differ from other symbols that do not include a group of bookmarks so that a user is able to readily identify groups of bookmarks and distinguish groups from single bookmarks.

The virtual space 702 allows a user to select the symbol 706 to view the bookmarks in the bookmark group. The virtual subspace 704 is displayed in response to user selection of the symbol 706. In the illustrated embodiment, a plurality of bookmarks associated with respective attribute datasets are symbolically represented in the virtual subspace 704. The virtual subspace 704 is a geometric representation of the semantic space at symbol 706. The virtual subspace 704 is therefore defined by orthogonal axes 708B, 710B, and 712B that represent the same attributes as the axes 708A, 710A, and 712A of virtual space 702. However, the range of attribute values for axes 708B, 710B, and 712B is less than that of axes 708A, 710A, and 712A of virtual space 702.

The virtual subspace 704 is thus providing an enlarged view of the region of virtual space 702 surrounding the symbol 706. The virtual subspace 704 shows bookmarks 714A, 714B, and 714C that are collectively shown as a group symbol 706 in virtual space 702. The virtual subspace 704 allows a user to select one of the bookmarks 714A-714C to be taken to the corresponding web page or document at the address or location stored with the selected bookmark.

Figure 8:
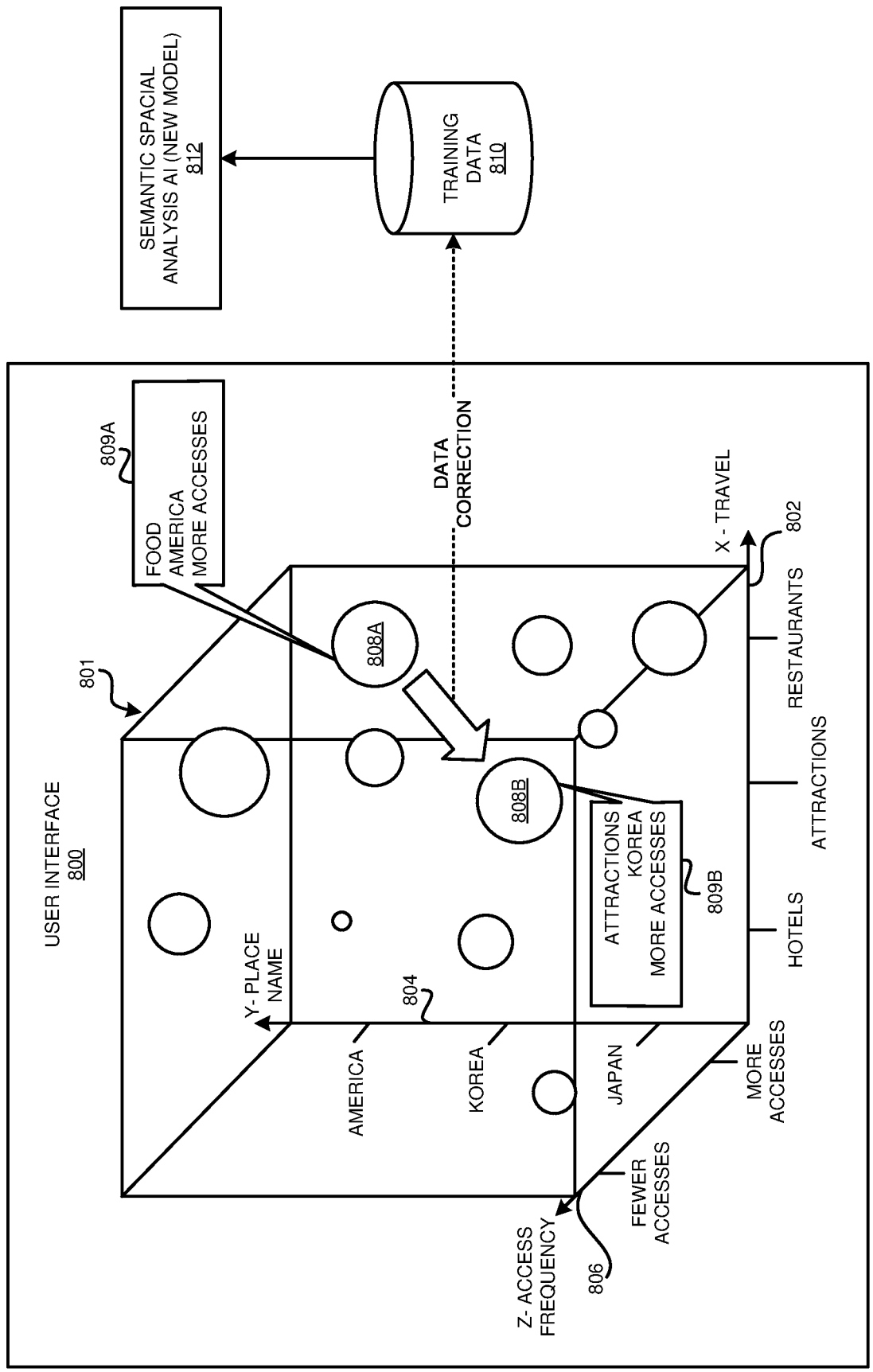
FIG. 8 depicts a schematic diagram of a user interface that allows users to update attribute values directly to bookmarks displayed in a 3D virtual space in accordance with an illustrative embodiment.
Figure 9:
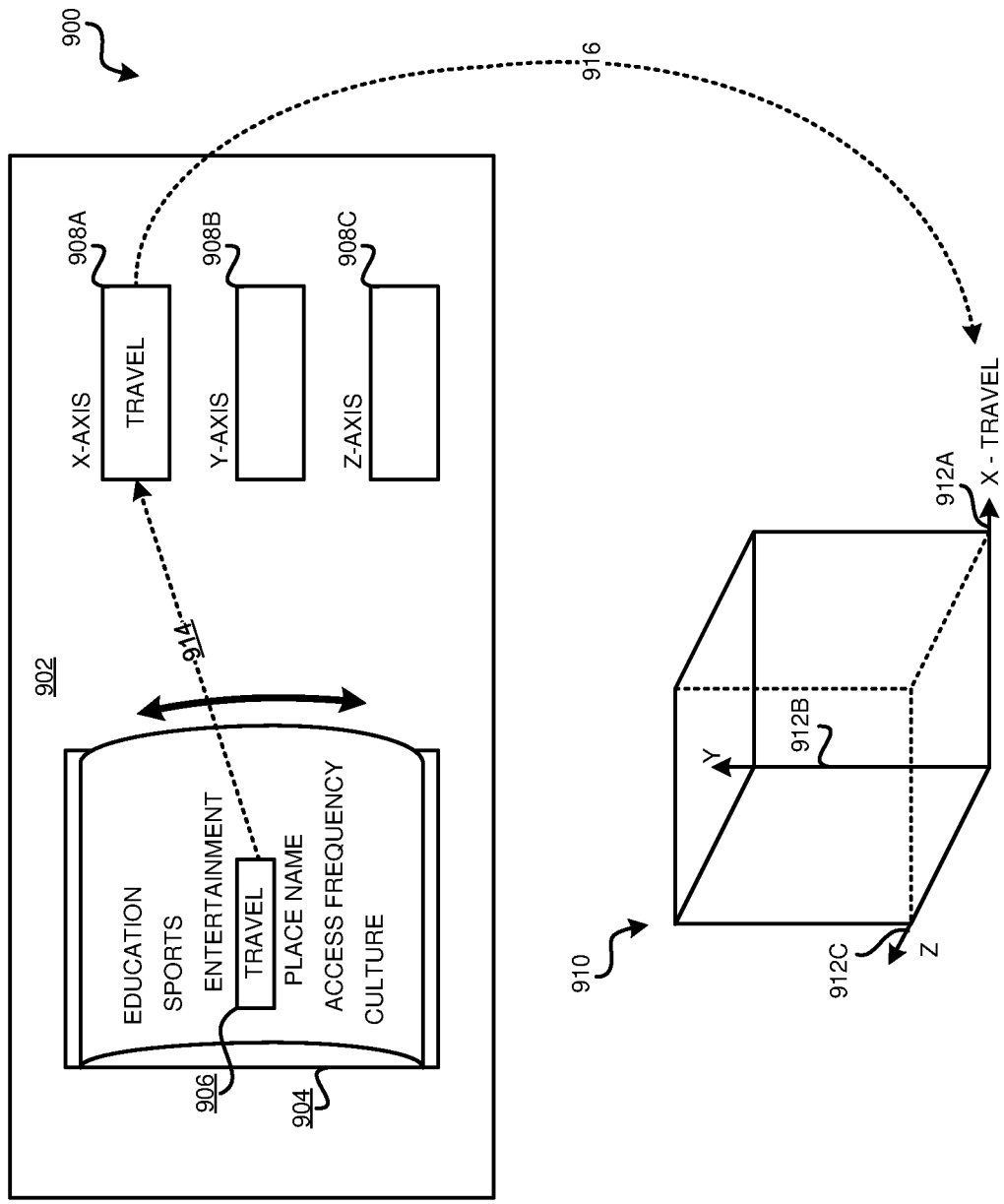
FIG. 9 depicts a schematic diagram of a user interface that allows users to select attributes for the three axes of a 3D virtual space in accordance with an illustrative embodiment.

With reference to FIG. 8, this figure depicts a schematic diagram of a user interface 800 that allows users to update attribute values directly to bookmarks displayed in a 3D virtual space 801 in accordance with an illustrative embodiment. The 3D virtual space 801 is representative of a sematic space that serves as an organizational construct for bookmarks in accordance with an illustrative embodiment. In a particular embodiment, the user interface 800 is an example of the user interface 406 of FIG. 4 and the virtual space 801 is an example of a 3D virtual space rendered by the bookmark management system 400 of FIG. 4. In the illustrated embodiment, the user interface 800 is in communication with a database that stores training data 810 that is used to train a machine learning model or the like of a semantic space analysis AI module 812. In a particular embodiment, the semantic space analysis AI module 812 is an example of the semantic space analysis AI module 420 of FIG. 4, and the training data 810 is stored in database 424 of FIG. 4.

In the illustrated embodiment, the user interface 800 allows for user interaction with the bookmark symbols displayed in the 3D virtual space 801. Specifically, the user interface 800 allows a user to correct one or more attribute values for a bookmark or bookmark group. In the illustrated embodiment, the user interface 800 allows for selection of a bookmark symbol, translation of the selected bookmark symbol in three DOFs (i.e., both directions parallel to each of the X, Y, and Z axes), and de-selection of the selected bookmark symbol, where such series of actions results in relocation of a bookmark symbol in the 3D virtual space 801. The new location will be associated with at least one revised attribute value. A user may thus make corrections to the attribute values by relocating bookmark symbols to align with the correct attribute values in the virtual space 801.

Virtual space 801 is defined by axes 802, 804, and 806, which correspond to axes 502, 504, and 506, respectively, of FIG. 5, such that the descriptions of axes 502, 504, and 506 applies equally to axes 802, 804, and 806. Thus, axes 802, 804, and 806 are associated with particular respective attributes, and coordinates along each axis are associated with respective attribute values. As a non-limiting example, axis 802 is the X axis and is associated with "TRAVEL," axis 804 is the Y axis and is associated with "PLACE NAMES," and axis 806 is the Z axis and is associated with "ACCESS FREQUENCY."

In the illustrated embodiment, a user viewing the virtual space 801 may notice that an attribute value of a bookmark being displayed is different from an expected attribute value. For example, a user may notice that symbol 808A has been assigned attribute values of "FOOD" for "TRAVEL" and "AMERICA" for "PLACE NAME." Recall that when bookmarks are imported or newly added to the bookmark management system 400 of FIG. 4, the semantic space analysis AI module 420 automatically classifies the bookmark based on content of the bookmarked web page or computer file. If this automatic classification process makes an erroneous classification, the user interface 800 allows a user to correct the attribute values.

For explanatory purposes, the illustrated non-limiting example shows a correction being made to bookmark 808A, which involves changing the attribute value for "TRAVEL" from "FOOD" to "ATTRACTIONS," and changing the attribute value for "PLACE NAME" from "AMERICA" to "KOREA." In the illustrated embodiment, the user interface 800 allows for selection of bookmark 808A, translation of the selected bookmark 808A in three degrees of freedom to the correct location where the symbol is re-designated as symbol 808B. In the updated location, the symbol 808B aligns with the correct attribute values of "ATTRACTIONS" for "TRAVEL" and "KOREA" for "PLACE NAME."

There are many known techniques that may be employed to allow for interacting with objects in a 3D virtual environment to achieve translation of objects in three degrees of freedom. For example, mouse-based interaction techniques and established mappings are known that involve a combination of mouse and keyboard inputs for translation in three degrees of freedom in a 3D virtual environment.

Also, alternative techniques for updating the attribute values are implemented in alternative embodiments that do not require a user to try to reposition a symbol in the virtual space 801. For example, in some embodiments, selection of a symbol, such as symbol 808A, results in display of the attribute values in window 809A. In some embodiments, the text in window 809A is editable, allowing a user to change the values to make the desired corrections. For example, a user may edit the attribute values in window 809A to the attribute values shown in window 809B. Once the attribute values are updated, the user interface 800 automatically updates the location of the symbol 808A to the corrected location shown as symbol 808B.

In some embodiments, once the attribute values are updated via the user interface 800, the user interface 800 generates training data 810 to improve the accuracy of the semantic space analysis AI module 812. In some embodiments, the semantic space analysis AI module 812 employs a machine learning model, and the training data 810 is used by the semantic space analysis AI module 812 to generate a new, updated machine learning model.

With reference to FIG. 9, this figure depicts a schematic diagram of a user interface 900 that allows users to select attributes for the three axes of a 3D virtual space 910 in accordance with an illustrative embodiment. The 3D virtual space 910 is representative of a sematic space that serves as an organizational construct for bookmarks in accordance with an illustrative embodiment. In a particular embodiment, the user interface 900 is an example of the user interface 406 of FIG. 4 and the virtual space 910 is an example of a 3D virtual space rendered by the bookmark management system 400 of FIG. 4.

In the illustrated embodiment, the user interface 900 allows a user to search or browse through bookmarks by selecting attributes associated with the desired bookmark. For example, if a user wishes to re-visit a previously bookmarked web page to purchase tickets for an event at a particular venue, the user may select attributes such as "EVENTS," "PLACE NAME," and "ENTERTAINMENT;" if the user then wishes to re-visit a previously bookmarked web page about educational museum tours in a particular city during an upcoming trip, the user may select attributes such as "EDUCATION," "TRAVEL," and "PLACE NAME." The user interface 900 includes a selection dialog 902 that allows a user to make such selections for the attributes associated with the axes of the virtual space 910.

Virtual space 910 is defined by axes 912A, 912B, and 912C, which correspond to axes 502, 504, and 506, respectively, of FIG. 5, such that the descriptions of axes 502, 504, and 506 applies equally to axes 912A, 912B, and 912C. Axes 912A, 912B, and 912C are assigned respective attributes based on user selections made in the selection dialog 902.

In the illustrated embodiment, the selection dialog 902 is rendered by the user interface 900 and provides functionality to allow a user to select attribute for the three axes of the virtual space 910. It will be appreciated that there are many alternative ways to provide such functionality with various different user controls in a user interface. In the illustrated embodiment, the selection dialog 902 includes a scrollable wheel 904 that a user can rotate in the vertical directions indicated in order to align the desired attribute in selection window 906. The user may then select an axis, such as X-axis as shown, to populate the X-axis attribute window 908A with the attribute from the selection wheel 904 as indicated by arrow 914, which in turn updates the view of the virtual space 910 to show the selected attribute the X-axis as indicated by arrow 916. The user may continue this process by selecting attributes to populate the Y-axis attribute window 908B and the Z-axis attribute window 908C in order to assign attributes to the Y and Z axes in the same manner.

In some embodiments, once attributes have been assigned to all three axes, the virtual space 910 will be populated with bookmarks having the three selected attributes. For example, if the user selects "TRAVEL" for the X-axis attribute, "PLACE NAME" for the Y-axis attribute, and "ACCESS FREQUENCY" for the Z-axis attribute, the result may appear as the example shown in FIG. 5.

With reference to FIG. 10, this figure depicts a block diagram of a summarization AI module 1000 in accordance with an illustrative embodiment. In a particular embodiment, the summarization AI module 1000 is an example of the summarization AI module 418 of FIG. 4.

In some embodiments, the summarization AI module 1000 includes an encoder module 1002, an attention distribution module 1004, a context vector module 1006, a vocabulary distribution module 1008, and a decoder module 1010. In alternative embodiments, the summarization AI module 1000 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the summarization AI module 1000 generates a summarized version of web page or file content. The summarized version can then be used to classify and determine attributes of the web page or file. This is particularly useful for web pages or files that have large amounts of text. While text classification techniques for short documents (e.g., less than 200 words), the effectiveness of such techniques diminishes when applied to longer documents. For very long documents (e.g., more than 10,000 words), the amount of text renders many text classification techniques overly burdensome and ineffective. For example, for RNN-based classifiers, it is very difficult to feed the full long-length document to a single RNN network because even for long-short term memory (LSTM), it cannot memorize such a large context. Therefore, the summarization AI module 1000 is utilized to generate a summarized version of a web page or file to be classified, where the summarized version has a reduced word count that is more manageable for the classification (e.g., by the semantic space analysis AI module 420 of FIG. 4).

In the illustrated embodiment, the summarization AI module 1000 is based on a neural framework of summarization known as the standard sequence-to-sequence attentional model. The AI module 1000 performs automatic text summarization according to known techniques that use a bi-directional LSTM encoder as the encoder 1002 and a single-layer LSTM decoder as the decoder 1010, where the encoder 1002 receives the text content of a web page or computer file being bookmarked and produces a sequence of encoder hidden states and generates an attention distribution 1004 at each decoding time step to help the decoder to focus on a specific part of the input text. The attention distribution 1004 is used to calculate the context vector 1006, which is the weighted sum of encoder hidden states, and can be used to produce a vocabulary distribution 1008. The decoder 1010 then generates the summary according to a probability distribution using the vocabulary distribution 1008 and context vector 1006.

In alternative embodiments, the summarization AI module 1000 uses other known automatic text summarization techniques to produce a summary. In general, the summarization AI module 1000 may employ any known technique that produces a textual output that conveys important information from the input text and includes less than half the number of words that are in the input text. Embodiments of the summarization AI module 1000 may employ extractive or abstractive summarization techniques.

With reference to FIG. 11, this figure depicts a block diagram of an example semantic space analysis AI module 1100 in accordance with an illustrative embodiment. In a particular embodiment, the semantic space analysis AI module 1100 is an example of the workloads and functions 96 for classifier processing of FIG. 1.

In some embodiments, the semantic space analysis AI module 1100 includes a feature extractor 1102, training data 1104, a multi-class trainer 1106, and a multi-class classifier 1108. In alternative embodiments, the semantic space analysis AI module 1100 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the semantic space analysis AI module 1100 processes the contents of a web page or computer file so that the 1100 may accurately identify certain attributes from a larger attribute list that most closely describe or coincide with that web page or computer file. The attribute list serves as a list of predefined classes of variation that are distinguished by the semantic space analysis AI module 1100. In some embodiments, if the semantic space analysis AI module 1100 does not identify an attribute from the predefined list that is suitable for a particular bookmark, the semantic space analysis AI module 1100 suggests one or more new attributes as classes for the bookmark. For example, in some embodiments, the semantic space analysis AI module 1100 may be part of a multi-user bookmark management system and have access to attributes used by other users for the same or similar content, in which case the semantic space analysis AI module 1100 may suggest an attribute used by other users that more closely matches the contents of a web page or computer file being bookmarked than the attributes currently on the user's own list. The user may accept the suggestion, enter an alternative new attribute, or keep the attribute list as-is and have the new bookmark classified with the closest matching attributes on the current list.

As non-limiting examples, various embodiments may include attributes that are based on any one or more of semantic categories of topics (e.g., travel, weather, information technology, healthcare), locations (e.g., domain, city, country, region), and/or properties of the bookmark or bookmarked content (e.g., access frequency, date/time of creating the bookmark, date/time the content was created, name of the author(s) of the content, date/time of last update of the content). Other examples of attributes may include characteristics related to visual information, audio information, and text information in the content. The attributes may include information that is contained by, or communicated by, various features, such as a certain texture, shape, appearance, sound, duration, arrangement, inter-relationship (such as between objects in a visual format) and order (such as of letters in text). In this regard, it may be considered that the attributes may exhibit various forms to provide a variety of ways to index or reference the content of the bookmarked web page or computer file.

As explained herein, a 3D virtual space that is defined by three orthogonal axes is rendered on a user interface with user-selectable attributes for each axis such that a user selects attributes to view the desired bookmarks. This means that the semantic space analysis AI module 1100 will need to classify each bookmark in at least three classes, where each class is a respective attribute, so that there is at least one combination of three attributes that will result in the bookmark being displayed. In some embodiments, the semantic space analysis AI module 1100 may classify a bookmark in more than three classes or a user may manually associate additional attributes with the bookmark so that there are two or more possible combinations of attribute values for the three axes that will result in the bookmark being displayed in the 3D virtual space.

In the illustrated embodiment, the semantic space analysis AI module 1100 undergoes a training phase followed by a prediction phase. During training, pairs of feature sets and labels that serve as the training data 1104 are fed into a multi-class trainer 1106 to generate a multi-class classifier model 1108. In some embodiments, the multi-class classifier model 1108 comprises a neural network, for example a convolutional neural network or a recurrent convolutional neural network. During the prediction phase, new content is input to the feature extractor 1102, which converts the input content to feature sets. These feature sets are then fed into the trained multi-class classifier model 1108, which generates multiple predicted classes for each content item (web page or computer file). The three or more classes that most closely associate with the content are stored in memory with the bookmark. The bookmark is associated with three or more classes so as to be displayed when this combination of attributes are selected. For example, in some embodiments, the multi-class classifier model 1108 outputs the list of all possible attributes that can be used to classify the bookmark and a probability score for each attribute. In some embodiments, the n classes with the highest probability scores are designated as the classifications for the bookmark, where n is a user-adjustable threshold value greater than or equal to three that guarantees a set number of classes for each bookmark. Alternatively, every class having a probability score that exceeds some value S is designated as one of the classifications for the bookmark, where S is a user-adjustable threshold value. In alternative embodiments, other types of text classifiers may be used such as a Naïve Bayes or Linear Support Vector Machine classifier.

Figure 12:
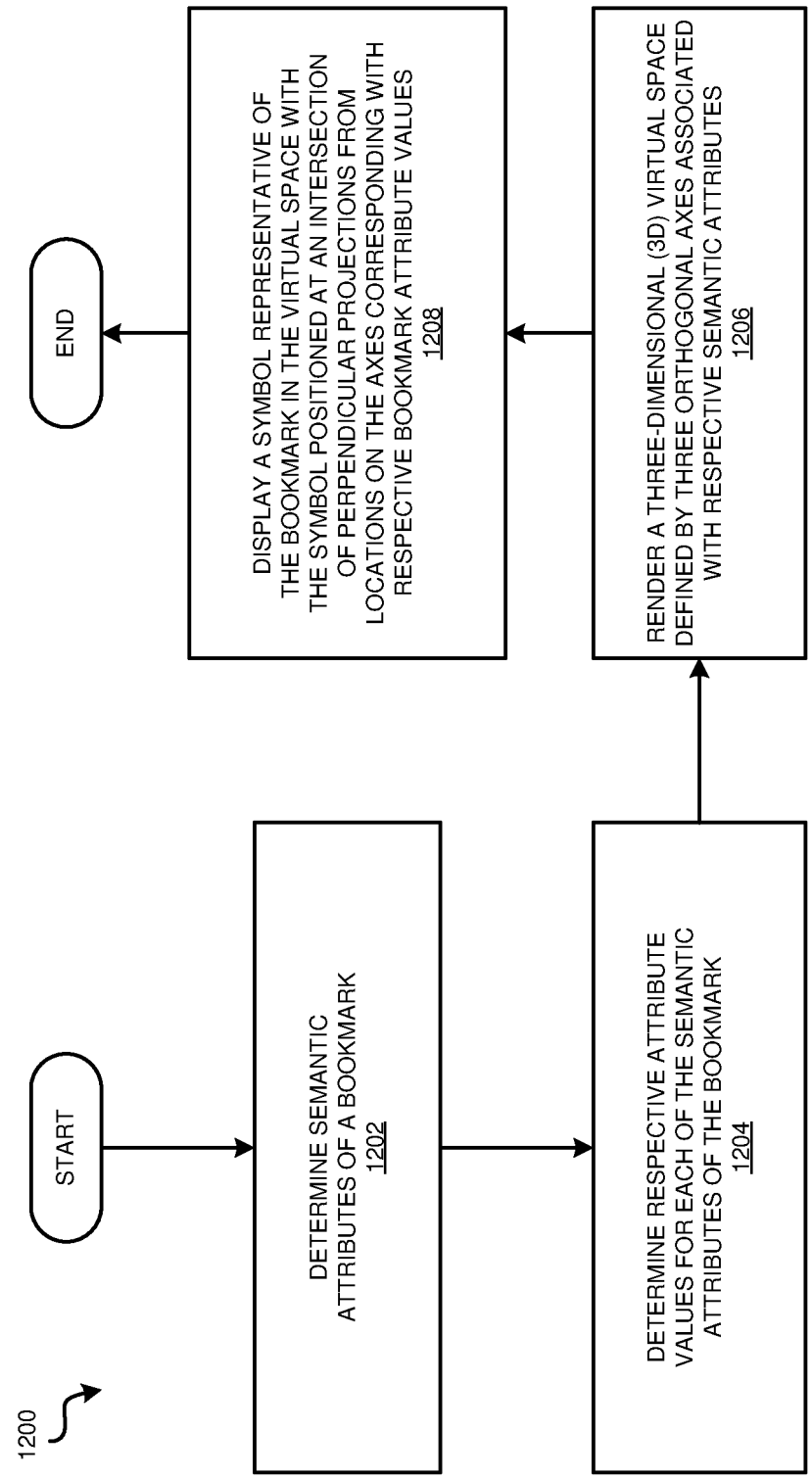
FIG. 12 depicts a flowchart of an example process for attribute-based positioning of bookmarks in a 3D virtual space in accordance with an illustrative embodiment.

With reference to FIG. 12, this figure depicts a flowchart of an example process 1200 for attribute-based positioning of bookmarks in a 3D virtual space in accordance with an illustrative embodiment. In a particular embodiment, the bookmark management system 400 of FIG. 4 carries out the process 1200.

In an embodiment, at block 1202, the process determines semantic attributes of a bookmark. In some embodiments, the process uses the semantic space analysis AI module 1100 of FIG. 11 to determine one or more attributes of the bookmark based on the bookmark or bookmarked content. In some embodiments, the process determines one or more attributes of the bookmark based on one or more attributes received as user input. In some embodiments, the process adds one or more attributes that are based on properties of the bookmark or bookmarked content (e.g., access frequency, date/time of creating the bookmark, date/time the content was created, name of the author(s) of the content, date/time of last update of the content).

Next, at block 1204, the process determines respective attribute values for each of the semantic attributes of the bookmark. The range of attribute values for an attribute may be continuous or discrete values depending on the attribute.

One type of continuous-value attribute is an attribute for which the assigned attribute value is indicative of a degree of relevance to the attribute, which is expressed as a numerical value, or a vector with only a positive value. For example, the attribute of IT SECURITY may be used for one bookmark to a blog post that provides an overview of technology careers with a small section about IT security, and another bookmark to a paper that is completely focused on IT security issues. The first bookmark will have a low degree of relevance since IT security is only a small part of the bookmarked content, whereas the second bookmark will have a high degree of relevance since IT security is the primary topic. In some embodiments, the semantic space analysis AI module 1100 may be used to determine the numerical values for the degrees of relevance that will be assigned as the attribute values.

An example of a discrete-value attribute is PLACE NAME, for which the attribute values are a fixed list of possible values, and the attribute value for the bookmark will typically appear in the bookmarked content. In some such embodiments, the attribute value can be determined using pattern matching by searching the bookmarked content for each possible attribute value. When a match is found, it is designated as the attribute value for that bookmark. In some embodiments, if no match is found, the process may search for a broader list of locations in the bookmarked content, and if one is found, the process may suggest to the user that this location be added to the list of attribute value locations.

Next, at block 1206, the process renders a three-dimensional (3D) virtual space for display to a user. For example, in some embodiments, the process renders a 3D virtual space, such as the virtual space 500 of FIG. 5 that is defined by three orthogonal axes 502, 504, and 506. A coordinate system defines a grid for locating objects in the virtual space, such that symbolic representations of bookmarks may be located within the virtual space using the coordinate system. In some embodiments, the coordinate system is a Cartesian system in 3D space, but in other embodiments, the coordinate system may be any other type of coordinate system, such as an oblate spheroid, cylindrical or spherical coordinate systems, polar coordinates systems, or other coordinate system designed for various manifolds or vector spaces, among others. In the illustrated embodiment, the virtual space is rendered on a two-dimensional screen so as to have the appearance of a cube or rectangular prism that is defined by three orthogonal axes (X, Y, Z).

Next, at block 1208, the process displays a symbol representative of the bookmark in the virtual space. In some embodiments, the symbol is positioned in the virtual space at an intersection of perpendicular projections from locations on the three axes corresponding with respective attribute values of the bookmark.

Figure 13:
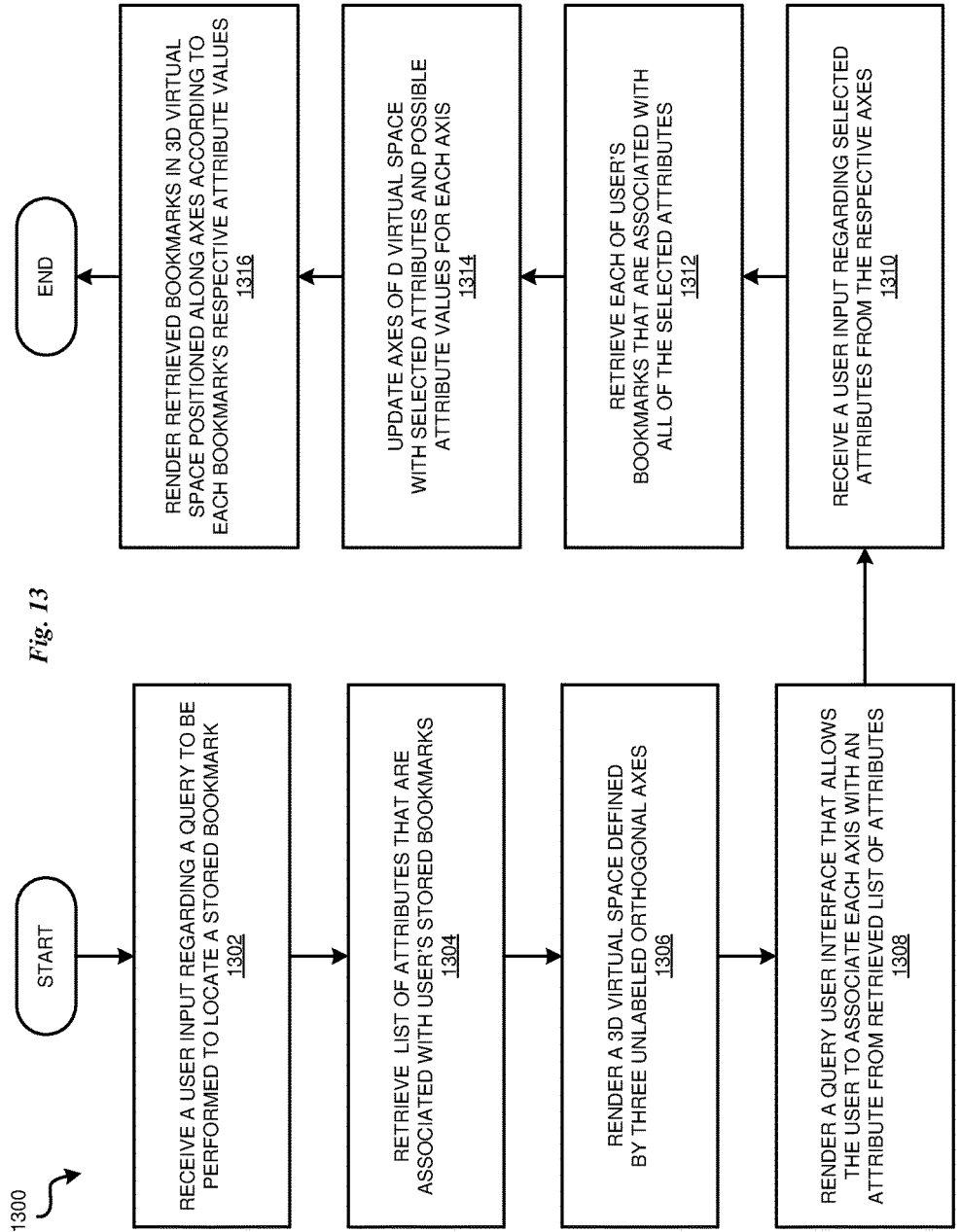
FIG. 13 depicts a flowchart of an example process for attribute-based searching for bookmarks in a 3D virtual space in accordance with an illustrative embodiment.

With reference to FIG. 13, this figure depicts a flowchart of an example process 1300 for attribute-based searching for bookmarks in a 3D virtual space in accordance with an illustrative embodiment. In a particular embodiment, the bookmark management system 400 of FIG. 4 carries out the process 1300.

At block 1302, the process receives a user input regarding a query to be performed to locate a stored bookmark. For example, in some embodiments, the user interface includes various menu items for performing operations on the bookmarks stored in a shared database of bookmarks or a user's personal database of bookmarks, including an option to initiate a query to search for a bookmark or group of bookmarks.

Next, at block 1304, the process retrieves a list of attributes that are associated with user's stored bookmarks. As a simple example, suppose a user has a total of ten bookmarks with the attributes shown in Table 1:

TABLE 1

| Bookmark ID | Attribute 1 | Attribute 2 | Attribute 3 |
| --- | --- | --- | --- |
| BKMK1 | Travel | Place Name | Entertainment |
| BKMK2 | Weather | News | Season |
| BKMK3 | Travel | News | Place Name |
| BKMK4 | Technology | News | Work Related |
| BKMK5 | Technology | E-Commerce | Entertainment |
| BKMK6 | Travel | Place Name | Entertainment |
| BKMK7 | Weather | News | Entertainment |
| BKMK8 | Technology | News | Education |
| BKMK9 | Travel | Place Name | Entertainment |
| BKMK10 | Travel | Place Name | Work Related |

Note that in an actual implementation, the bookmark IDs would be descriptive of the bookmarked content (e.g., "Grand Canyon homepage," "Weather Blog," etc.). In this example, the process will retrieve (TRAVEL, E-COMMERCE, EDUCATION, ENTERTAINMENT, NEWS, PLACE NAME, SEASON, WEATHER, TECHNOLOGY, TRAVEL, WORK RELATED). The bookmarks may also include additional attributes based on properties of the bookmark or bookmarked content, such as access frequency, date created, etc., which would also be included in the list of retrieved attributes.

Next, at block 1306, the process renders a 3D virtual space defined by three unlabeled orthogonal axes and at block 1308 the process renders a query user interface that allows the user to associate each axis with an attribute from retrieved the list of attributes. In some embodiments, the process renders the 3D virtual space 910 of FIG. 9 having the three unlabeled axes 912A-912C and the selection dialog 902 of FIG. 9 that allows the user to associate attributes with the blank axes. The data for displaying the rendered 3D virtual space is transmitted to a user device, such as computing devices 54A-54C of FIG. 1, where it is displayed for the user.

Next, at block 1310, the process receives a user input regarding selected attributes for the respective axes. In some embodiments, the user selects from the list of attributes that was retrieved at block 1304. Next, at block 1312, the process retrieves each of user's bookmarks that are associated with all of the selected attributes. Using the above example from Table 1, suppose the user selects the attributes TRAVEL, PLACE NAME, and ENTERTAINMENT. Three of the bookmarks are associated with all of these selected attributes and will be retrieved from the database of bookmarks: BKMK1, BKMK6, and BKMK9.

Next, at block 1314, the process updates the axes of the 3D virtual space with the selected attributes and possible attribute values for each axis, and at block 1316, the process renders the retrieved bookmarks in the 3D virtual space positioned along the axes according to each bookmark's respective attribute values. In an embodiment, the resulting display may appear like the example 3D virtual space 500 shown in FIG. 5.

Figure 14:
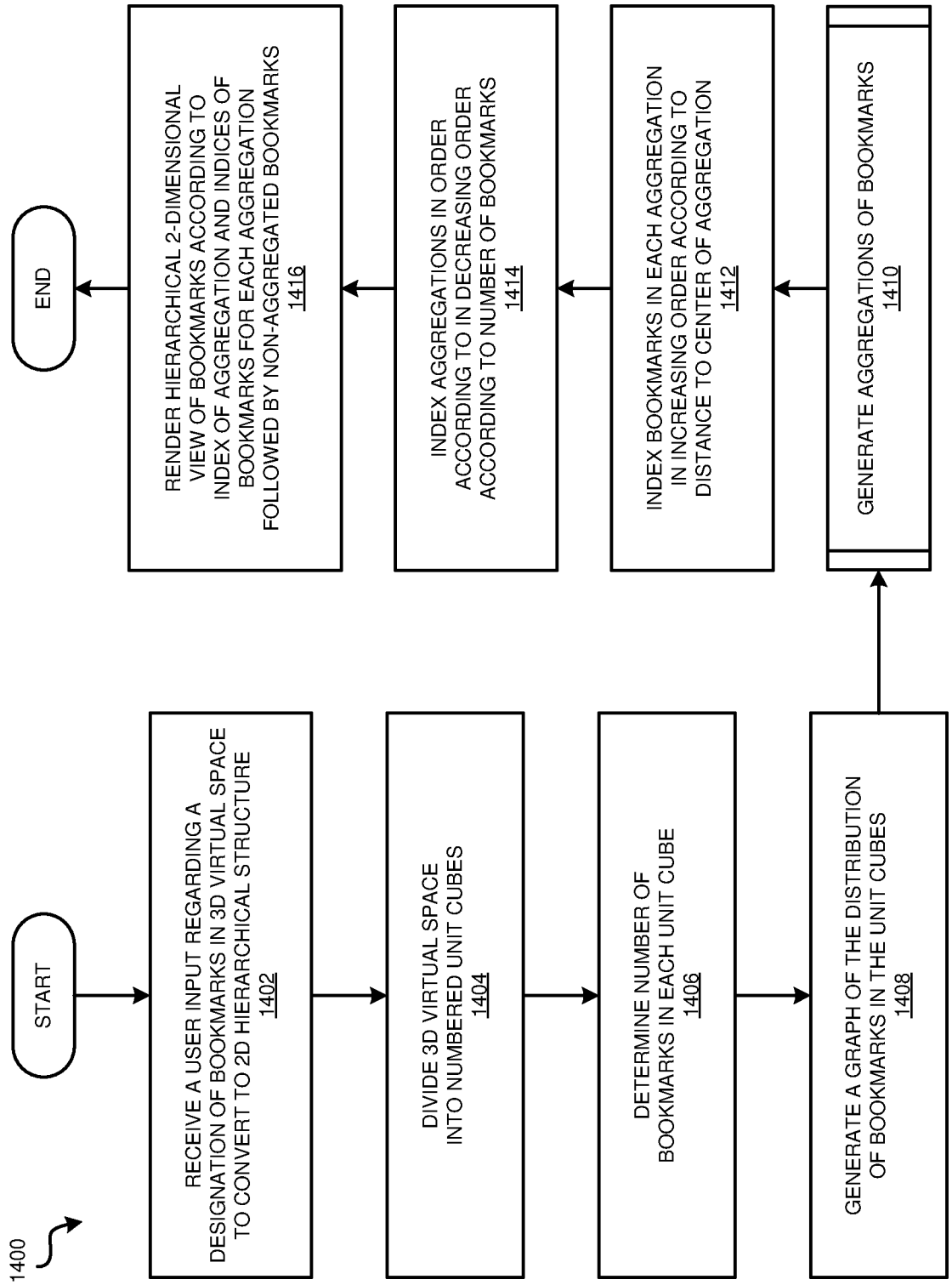
FIG. 14 depicts a flowchart of an example process for generating a hierarchical view of the bookmarks from a 3D virtual space in accordance with an illustrative embodiment.

With reference to FIG. 14, this figure depicts a flowchart of an example process 1400 for generating a hierarchical view of the bookmarks from a 3D virtual space in accordance with an illustrative embodiment. In a particular embodiment, the bookmark management system 400 of FIG. 4 carries out the process 1400.

At block 1402, the process receives a user input regarding a designation of bookmarks in 3D virtual space to convert to 2D hierarchical structure. For example, in some embodiments, the user may limit the bookmarks that will be in the hierarchical view to those with certain attributes. In some embodiments, the process 1300 in FIG. 13 is used to designate bookmarks to show in the hierarchical view.

Figure 16:
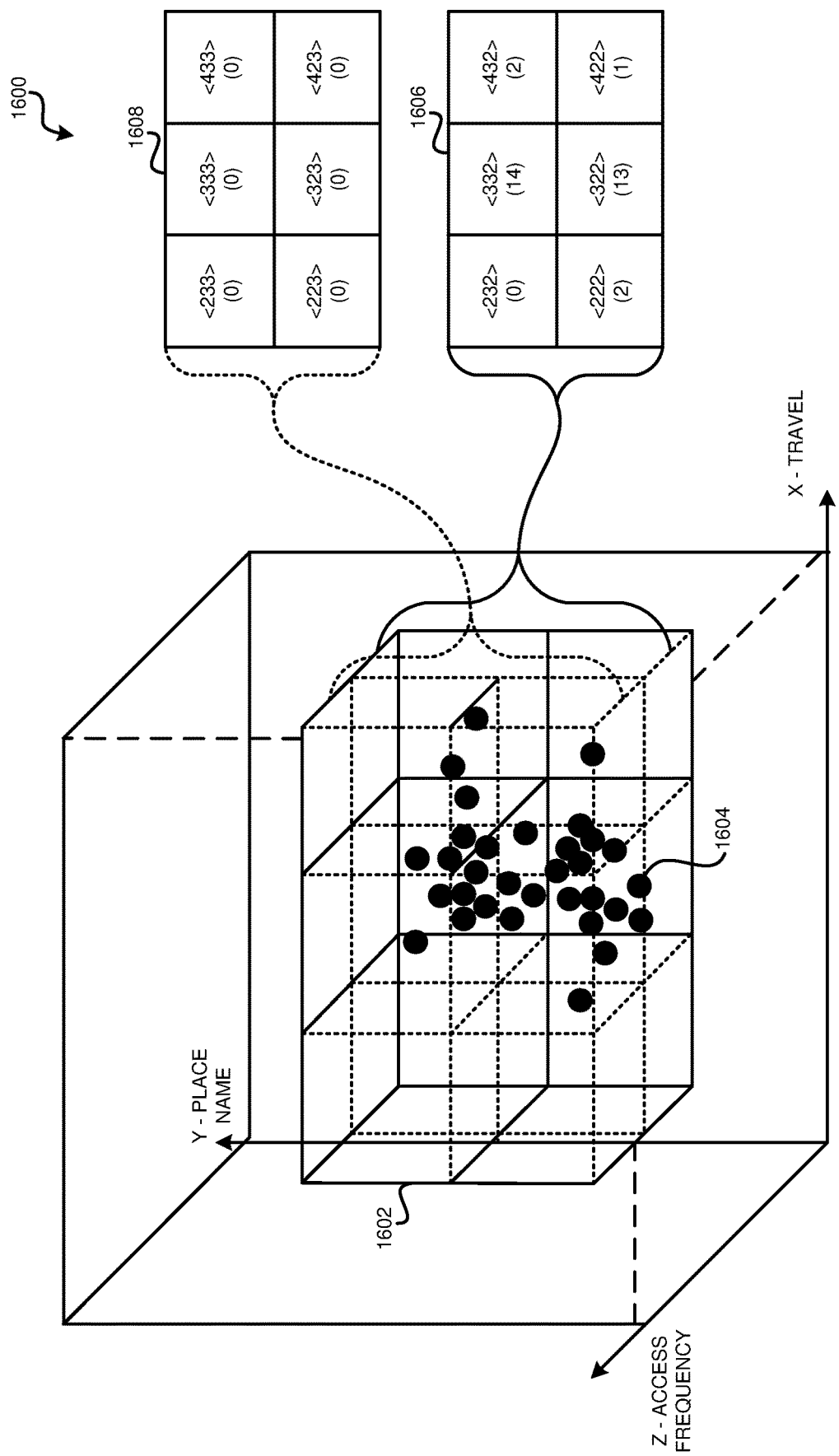
FIG. 16 depicts a schematic block diagram of a 3D virtual space partially divided into unit cubes in accordance with an illustrative embodiment.

Next, at block 1404, the process divides 3D virtual space into numbered unit cubes. For example, FIG. 16 shows an example of a 3D virtual space 1600 that has been partially divided into numbered unit cubes 1602. The axes of the virtual space 1600 have been assigned attributes, and the resulting bookmarks 1604 are displayed within the virtual space 1600. In this example, the virtual space 1600 has been partially divided into twelve unit cubes. The details of the front six unit cubes are shown as blocks 1606, and the details of the back six unit cubes are shown as blocks 1608. In blocks 1606 and 1608, the three-digit number in angle brackets is the cube number and the number in parenthesis is the number of bookmarks in that unit cube. In this embodiment, the unit cubes are each assigned a unique three-digit number corresponding to the block position with respect to the axes <X, Y, Z>. Thus, the first digit increments from left to right, the second digit increments from bottom to top, and the third digit increments from front to back.

Figure 17:
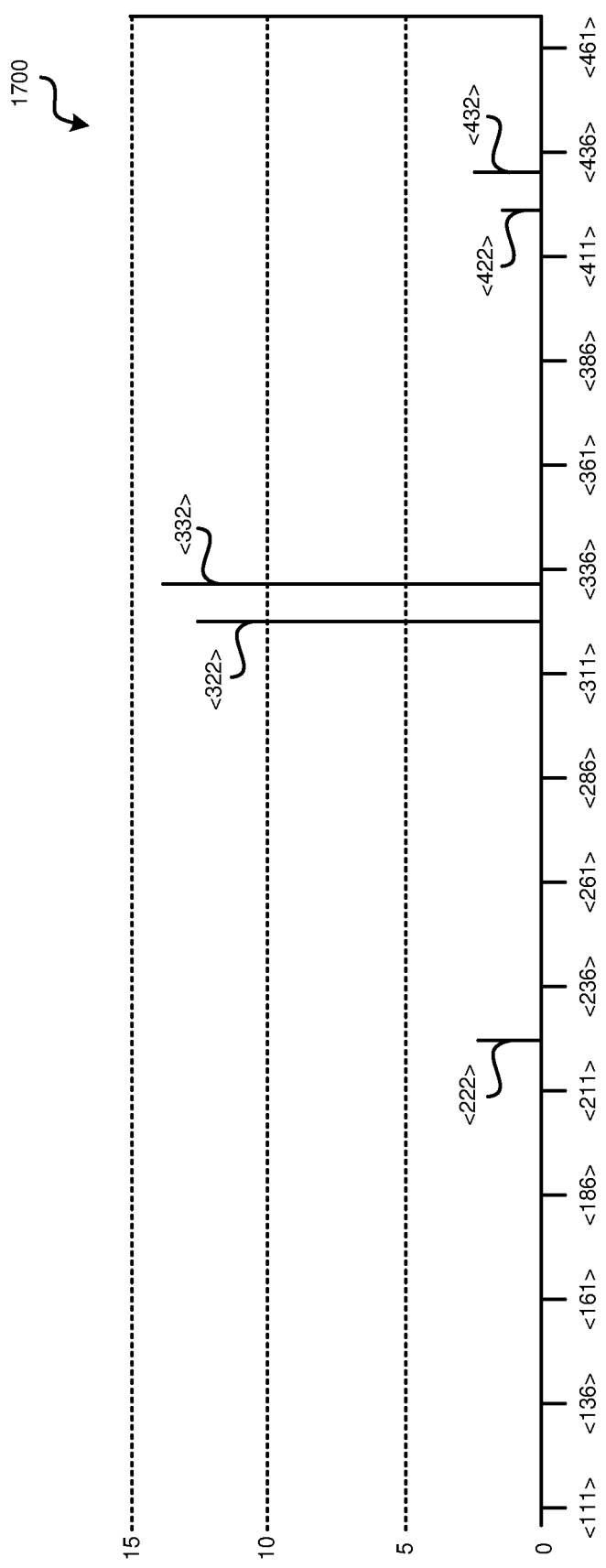
FIG. 17 depicts a graph of a distribution of bookmarks in a portion of a 3D virtual space in accordance with an illustrative embodiment.

Next, at block 1406, the process determines the number of bookmarks in each unit cube, and at block 1408, the process generates a graph of the distribution of bookmarks in the unit cubes. For example, FIG. 17 shows a graph 1700 of the distribution of bookmarks from the unit cubes 1602 in the virtual space 1600 of FIG. 16. For each unit cube that has at least one bookmark, the number of bookmarks is indicated on the graph 1700 and labeled with the corresponding cube number. The values are arranged in ascending order by cube number. However, other arrangements and types of graphs may be used.

Next, at block 1410, the process generates aggregations of bookmarks. In some embodiments, the process references a threshold density value, and generates an aggregation for each unit cube that exceeds the threshold value. The threshold density value is a number of bookmarks in a single unit cube. The threshold density value may be adjusted or set by the user according to how many bookmarks they are comfortable viewing in a single unit cube. If the number of bookmarks in a unit cube exceeds this threshold amount, the process will group the bookmarks together into an aggregate that will be displayed as a single symbol unless and until expanded by the user. If too many bookmarks are being displayed in a region too small to display them, the view will appear overly cluttered in the 3D virtual space and in the hierarchical view being prepared. The aggregating is therefore performed to avoid an overly cluttered display. In some embodiments, the aggregating is performed according to the process 1500 shown in FIG. 15 and described below.

Next, at block 1412, the process indexes the bookmarks in each aggregation in increasing order according to distance to center of aggregation, at block 1414, the process indexes aggregations in order according to in decreasing order according to number of bookmarks, and at block 1416, the process renders a hierarchical 2-dimensional view of bookmarks according to the index of aggregation and indices of bookmarks for each aggregation followed by non-aggregated bookmarks.

Figure 18:
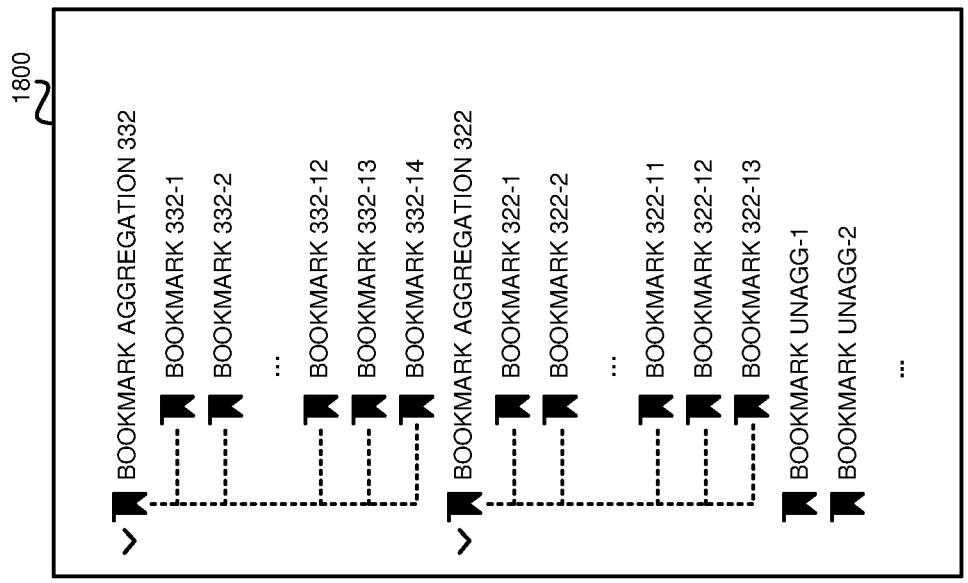
FIG. 18 depicts an exemplary hierarchical two-dimensional view of bookmarks in accordance with an illustrative embodiment.

For example, FIG. 18 shows a hierarchical view 1800 of the bookmarks from the unit cubes 1602 in the virtual space 1600 of FIG. 16. In the illustrated embodiment, the bookmarks in the unit cubes <332> and <322> have been aggregated and are shown as "BOOKMARK AGGREGATION 332" and "BOOKMARK AGGREGATION 322." In an actual implementation, the aggregation names may be descriptive of the bookmarked content. In some embodiments, the aggregation names are automatically generated using an NLP summarization process. In some embodiments, the summarization AI module 1000 generates names for the aggregations by summarizing the bookmarked content. In the illustrated embodiment, the bookmarks that were not aggregated are then displayed below the two aggregations. In some embodiments, additional hierarchical levels may be generated by further aggregating the aggregated bookmarks. For example, the two aggregations "BOOKMARK AGGREGATION 332" and "BOOKMARK AGGREGATION 322" may be combined into a single aggregation of aggregations, which would then be displayed at the top of the hierarchical view 1800.

Figure 15:
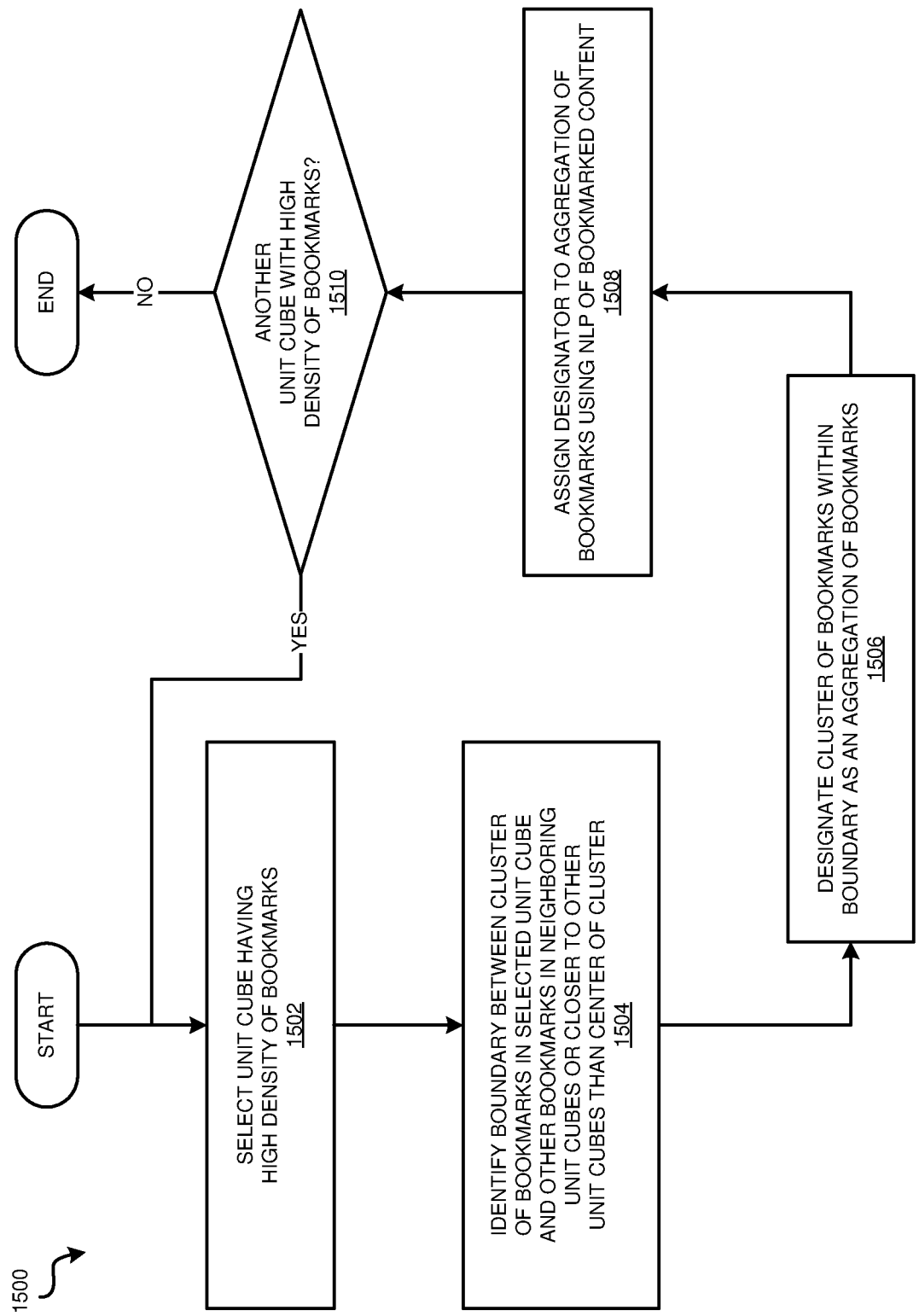
FIG. 15 depicts a flowchart of an example process for aggregating bookmarks in accordance with an illustrative embodiment.

With reference to FIG. 15, this figure depicts a flowchart of an example process 1500 for aggregating bookmarks in accordance with an illustrative embodiment. In a particular embodiment, the bookmark management system 400 of FIG. 4 carries out the process 1500 at block 1410 of process 1400 of FIG. 14.

At block 1502, the process selects a unit cube having a high density of bookmarks. In some embodiments, the process identifies a density as being a "high" density by referencing a threshold density value that sets the threshold number of bookmarks that may be in a single unit cube before it is considered to be high density. In such embodiments, if the number of bookmarks in a unit cube exceeds the threshold value, it is treated as having a high density of bookmarks. The threshold density value may be adjusted or set by the user according to how many bookmarks they are comfortable viewing in a single unit cube. If the number of bookmarks in a unit cube exceeds this threshold amount, the process will group the bookmarks together into an aggregate that will be displayed as a single symbol unless and until expanded by the user. If too many bookmarks are being displayed in a region too small to display them, the view will appear overly cluttered in the 3D virtual space and in the hierarchical view being prepared. The aggregating is therefore performed to avoid an overly cluttered display.

Next, at block 1504, the process identifies a boundary around a cluster of bookmarks in selected unit cube. In some cases, all of the bookmarks in the selected unit cube will be included in an aggregate that is formed. There may be other cases where the selected unit cube has a cluster of bookmarks and one or more outlying bookmarks that are more naturally appear to be part of a cluster in a neighboring unit cube. In some embodiments, the process checks neighboring unit cubes for high densities and identifies clusters in neighboring unit cubes that have high bookmark densities. If a neighboring unit cube is found to have a high-density cluster, then the process calculates the center of the cluster in the selected unit cube and the center of the cluster in the neighboring unit cube and groups outliers with the cluster having the closest center to the outlier.

In some embodiments, the attribute values of the bookmarks (which are the coordinates used to locate the bookmarks) in both clusters are used to calculate the cluster center, excluding any bookmarks that appear to be outliers. There are known techniques for determining cluster centers using coordinate values that may be employed in various embodiments. The outliers may also be detected using the attribute values. For example, in a unit cube, some number of bookmarks may have attribute values that are all within some $\Delta X$, $\Delta Y$, and $\Delta Z$, and then for some $k(\Delta X, \Delta Y, \Delta Z)$ there are no bookmarks, where k is a non-zero value that is indicative of a gap, any bookmarks beyond that may be considered outliers. In some embodiments, k may be a user-settable value that allows the user to control how tight or loose a cluster can be before checking for outliers that may belong in a neighboring cluster.

Next, at block 1506, once the boundary for the cluster in the selected unit cube is determined, the process designates the bookmarks in the cluster as being identified for the new aggregate. In some embodiments, the bookmark data for each of the bookmarks is updated to include an indication of the bookmark being part of an aggregation of bookmarks. This indication may then be used to prevent the display of the bookmark in favor of the aggregated bookmarks symbol. This bookmark would then be displayed only if its parent aggregated symbol is selected to display the individual bookmarks.

Next, at block 1508, the process assigns a designator to the aggregation of bookmarks. In some embodiments, the designator may be descriptive of the bookmarked content. In some embodiments, the aggregation names are automatically generated using an NLP summarization process. In some embodiments, the summarization AI module 1000 generates names for the aggregations by summarizing the bookmarked content.

The process of forming the aggregated bookmark group is completed, so at block 1510, the process determines if there is are still any other unit cubes that have a high density of bookmarks to aggregate. If so, the process begins again at block 1502 for the next unit cube. Otherwise, the process is complete.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
classifying, using a semantic space analysis module, a content identified by a bookmark into a plurality of classes, each class corresponding to a semantic attribute of the content identified by the bookmark;
determining respective attribute values for each of the semantic attributes of the content identified by the bookmark;
rendering a three-dimensional (3D) virtual space for display to a user, wherein the virtual space is defined by three orthogonal axes, wherein each of the orthogonal axes is associated with a respective one of the semantic attributes; and
displaying a symbol representative of the bookmark in the virtual space, wherein the displaying includes positioning the symbol in the virtual space at an intersection of perpendicular projections from locations on the three axes corresponding with respective attribute values of the attributes associated with the respective axes, wherein the bookmark is one of a plurality of bookmarks represented by the symbol.

2. The method of claim 1, further comprising:
detecting a selection by the user of the symbol; and
rendering, responsive to the detecting of the user selection, a subspace of the virtual space and symbols in the subspace representative of respective bookmarks of the plurality of bookmarks.

3. The method of claim 1, wherein the displaying includes setting a size of the symbol based on an access frequency of the bookmark.

4. The method of claim 1, wherein the bookmark includes a Uniform Resource Locator (URL) of a web page.

5. The method of claim 1, further comprising:
determining, using the semantic space analysis module, a degree of relevance of a first class in the plurality of classes to a first semantic attribute; and
designating the degree of relevance as the attribute value of the first semantic attribute.

6. The method of claim 1, further comprising:
selecting a fixed value from a fixed value list for a first semantic attribute for the content using pattern matching processing of the content; and
designating the fixed value as the attribute value of the first semantic attribute.

7. The method of claim 1, wherein the bookmark includes a physical storage location of a computer file.

8. The method of claim 1, further comprising:
detecting a relocation of the symbol by the user to an updated location; and
updating at least one of the attribute values based on the updated location relative to the axes.

9. A computer program product, the computer program product comprising one or more computer readable storage media, and program instructions collectively stored on the one or more computer readable storage media, the program instructions executable by one or more processors to cause the one or more processors to perform operations comprising:
classifying, using a semantic space analysis module, a content identified by a bookmark into a plurality of classes, each class corresponding to a semantic attribute of the content identified by the bookmark;
determining respective attribute values for each of the semantic attributes of the content identified by the bookmark;
rendering a three-dimensional (3D) virtual space for display to a user, wherein the virtual space is defined by three orthogonal axes, wherein each of the orthogonal axes is associated with a respective one of the semantic attributes; and
displaying a symbol representative of the bookmark in the virtual space, wherein the displaying includes positioning the symbol in the virtual space at an intersection of perpendicular projections from locations on the three axes corresponding with respective attribute values of the attributes associated with the respective axes, wherein the bookmark is one of a plurality of bookmarks represented by the symbol.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

12. The computer program product of claim 9, further comprising:
detecting a selection by the user of the symbol; and
rendering, responsive to the detecting of the user selection, a subspace of the virtual space and symbols in the subspace representative of respective bookmarks of the plurality of bookmarks.

13. The computer program product of claim 9, wherein the displaying includes setting a size of the symbol based on an access frequency of the bookmark.

14. A computer system comprising one or more processors and one or more computer readable storage media, and program instructions collectively stored on the one or more computer readable storage media, the program instructions executable by the one or more processors to cause the one or more processors to perform operations comprising:
classifying, using a semantic space analysis module, a content identified by a bookmark into a plurality of classes, each class corresponding to a semantic attribute of the content identified by the bookmark;
determining respective attribute values for each of the semantic attributes of the content identified by the bookmark;
rendering a three-dimensional (3D) virtual space for display to a user, wherein the virtual space is defined by three orthogonal axes, wherein each of the orthogonal axes is associated with a respective one of the semantic attributes; and
displaying a symbol representative of the bookmark in the virtual space, wherein the displaying includes positioning the symbol in the virtual space at an intersection of perpendicular projections from locations on the three axes corresponding with respective attribute values of the attributes associated with the respective axes, wherein the bookmark is one of a plurality of bookmarks represented by the symbol.

15. The computer system of claim 14, further comprising:
detecting a selection by the user of the symbol; and
rendering, responsive to the detecting of the user selection, a subspace of the virtual space and symbols in the subspace representative of respective bookmarks of the plurality of bookmarks.

16. The computer system of claim 14, wherein the displaying includes setting a size of the symbol based on an access frequency of the bookmark.

* * * * *